US012017338B2

(12) United States Patent
Shechtman et al.

(10) Patent No.: US 12,017,338 B2
(45) Date of Patent: Jun. 25, 2024

(54) CONVERTIBLE SAWHORSE AND WORKTABLE

(71) Applicant: The Stanley Works Israel ltd., Rosh Ha'Ayin (IL)

(72) Inventors: Victoria Shechtman, Holon (IL); Ohad Waissengreen, D.N. Emek Sorek (IL)

(73) Assignee: The Stanley Works Israel LTD., Hosh Ha'Ayin (IL)

( * ) Notice: Subject to any disclaimer, the term of this patent is extended or adjusted under 35 U.S.C. 154(b) by 0 days.

(21) Appl. No.: 18/116,459

(22) Filed: Mar. 2, 2023

(65) Prior Publication Data

US 2023/0202023 A1 Jun. 29, 2023

Related U.S. Application Data

(63) Continuation of application No. 16/986,630, filed on Aug. 6, 2020, now Pat. No. 11,597,074.

(60) Provisional application No. 62/887,848, filed on Aug. 16, 2019.

(51) Int. Cl.
*B25H 1/06* (2006.01)
*B25H 1/04* (2006.01)
*B25H 1/18* (2006.01)

(52) U.S. Cl.
CPC ................. *B25H 1/06* (2013.01); *B25H 1/04* (2013.01); *B25H 1/18* (2013.01)

(58) Field of Classification Search
CPC ... B25H 1/00; B25H 1/04; B25H 1/06; B25H 1/08; B25H 1/10; B25H 1/12; B25H 1/14; B25H 1/18; B25H 1/0078; A47B 3/00; A47B 3/08; A47B 3/087; A47B 5/04; A47B 2001/105; A47B 2009/046; A47B 2200/0042; A47B 13/081; A47B 3/002; B27B 21/00; B27B 5/06; B27B 17/0041; B23Q 9/0042; B23Q 9/0014; F16M 11/00
USPC ......... 269/16, 136–140, 289, 291, 296, 901, 269/289 R; 248/434; 182/151, 153, 155, 182/181.1, 186.5; 108/5, 143, 115, 117
See application file for complete search history.

(56) References Cited

U.S. PATENT DOCUMENTS 5,924,684 A * 7/1999 Cheng ...................... B25H 1/14 269/220
6,659,440 B2 * 12/2003 Levy ........................ B25H 1/12 269/45
10,092,089 B1 * 10/2018 Yuan ...................... A47B 3/002
(Continued)

*Primary Examiner* — Brian D Keller
*Assistant Examiner* — Tim Brady
(74) *Attorney, Agent, or Firm* — Bruce S. Shapiro

(57) ABSTRACT

A convertible sawhorse and work table assembly includes two sawhorse legs, a worktable and two pivoting support rods. The two support rods are pivotably attached to the work table near one end thereof and to one of the sawhorse legs at the other end thereof. When in the closed condition, the sawhorse legs are folded against each other, with the worktable folded along one of the legs and the two support rods folded against the other sawhorse leg. In a second condition, the sawhorse legs are pivoted away from each other with the worktable and support rods remaining folded against the legs. In a third condition, the table is pivoted upwardly away from the one sawhorse leg until it is disposed substantially horizontally above the sawhorse legs, and is then slid rearwardly relative thereto until the pivot support rods are fully extended away from the other sawhorse legs.

3 Claims, 42 Drawing Sheets

(56) References Cited

U.S. PATENT DOCUMENTS

| | | | | |
|---|---|---|---|---|
| 2002/0105129 | A1* | 8/2002 | Levy | B25H 1/06 269/45 |
| 2006/0118012 | A1* | 6/2006 | Katz | B25H 1/04 108/129 |
| 2014/0232053 | A1* | 8/2014 | Lifshitz | B25B 23/141 269/244 |
| 2019/0001481 | A1* | 1/2019 | Faibish | A47B 3/08 |

* cited by examiner

CONVERTIBLE SAWHORSE AND WORKTABLE

CROSS-REFERENCE TO RELATED APPLICATIONS

This application is a continuation of U.S. patent application Ser. No. 16/986,630 filed Aug. 6, 2020, which claims priority to U.S. Provisional Patent Application Ser. No. 62/887,848 filed Aug. 16, 2019. The contents of each are incorporated herein by reference in their entireties.

FIELD OF THE INVENTION

The invention is directed to an assembly which can be moved between a first position where it can be used as a sawhorse to a second position where it can be used as a worktable.

BACKGROUND

Portable sawhorse assemblies which can be switched between sawhorse and workpiece support configurations are known, for example as disclosed in U.S. Pat. No. 6,659,440 entitled Portable Support Assembly for a Workpiece, owned by the assignee of the present invention, the disclosure of which is hereby incorporated by reference. The structure disclosed therein requires the workpiece support table to be fully disconnected from the sawhorse elements and separately pivoted about its support rods to be moved from the workpiece support configuration into the sawhorse or storage condition.

SUMMARY OF THE INVENTION

In a first embodiment the invention is direction to an assembly having a sawhorse including first and second sawhorse legs pivotably connected to each other at one end thereof to define an upper end of the sawhorse. The first and second sawhorse legs are pivotable relative to each other between a closed sawhorse position in which the first and second sawhorse legs are folded substantially against each other and an open sawhorse position in which the first and second sawhorse legs are spaced apart from each other below the upper end. A worktable defines first and second worktable sides. A first rack and a second rack are secured to the worktable. The first rack is disposed adjacent the first table side and the second rack is disposed adjacent the second table side. A first gear disposed in engagement with the first rack and a second gear is disposed in engagement with the second rack. A gear axis rod extends and is secured adjacent a first end to the first gear and adjacent a second end to the second gear. A support leg is pivotably secured adjacent one end thereof to the first sawhorse leg and pivotably secured adjacent a second end thereof to the worktable. In a first condition of the assembly, the sawhorse is in the closed sawhorse position, the worktable is disposed outwardly adjacent of the second sawhorse leg and the support leg is disposed outwardly adjacent of the first sawhorse leg. The assembly may be moved to a second condition in which the sawhorse is in the open sawhorse position, the worktable is supported at an inward location thereof by the upper end of the sawhorse and the worktable is supported adjacent an end thereof by the support leg. The worktable slides above the upper end of the sawhorse during at least a portion of the movement between the first and second conditions with the racks causing simultaneous rotation of said gear via the gear rod.

In a second embodiment the invention is directed to an assembly having a sawhorse including a first sawhorse leg and a second sawhorse leg pivotably connected to each other at the upper ends thereof. The sawhorse legs include sawhorse feet at the lower ends thereof. Two pivot support rods are each pivotably mounted at a lower end thereof to the feet of the first sawhorse leg and have a sliding rod disposed therethrough adjacent an upper end thereto. A worktable has a lower surface and two pairs of flanges, each of the pair of flanges is disposed at a corner of the worktable. Each flange has a channel formed therethrough. One of the sliding rods is slidably disposed at either end thereof in one channel of one flange of a pair of flanges. The work table has a first rack and a second rack disposed on the lower surface. A first gear is disposed in engagement with the first rack and a second gear is disposed in engagement with the second rack. A gear axis rod extends between and is engaged with the first gear and the said second gear.

These and other objects, features, and characteristics of the present invention, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of “a”, “an”, and “the” include plural references unless the context clearly dictates otherwise.

DETAILED DESCRIPTION OF EXEMPLARY EMBODIMENT

Figure 1A:
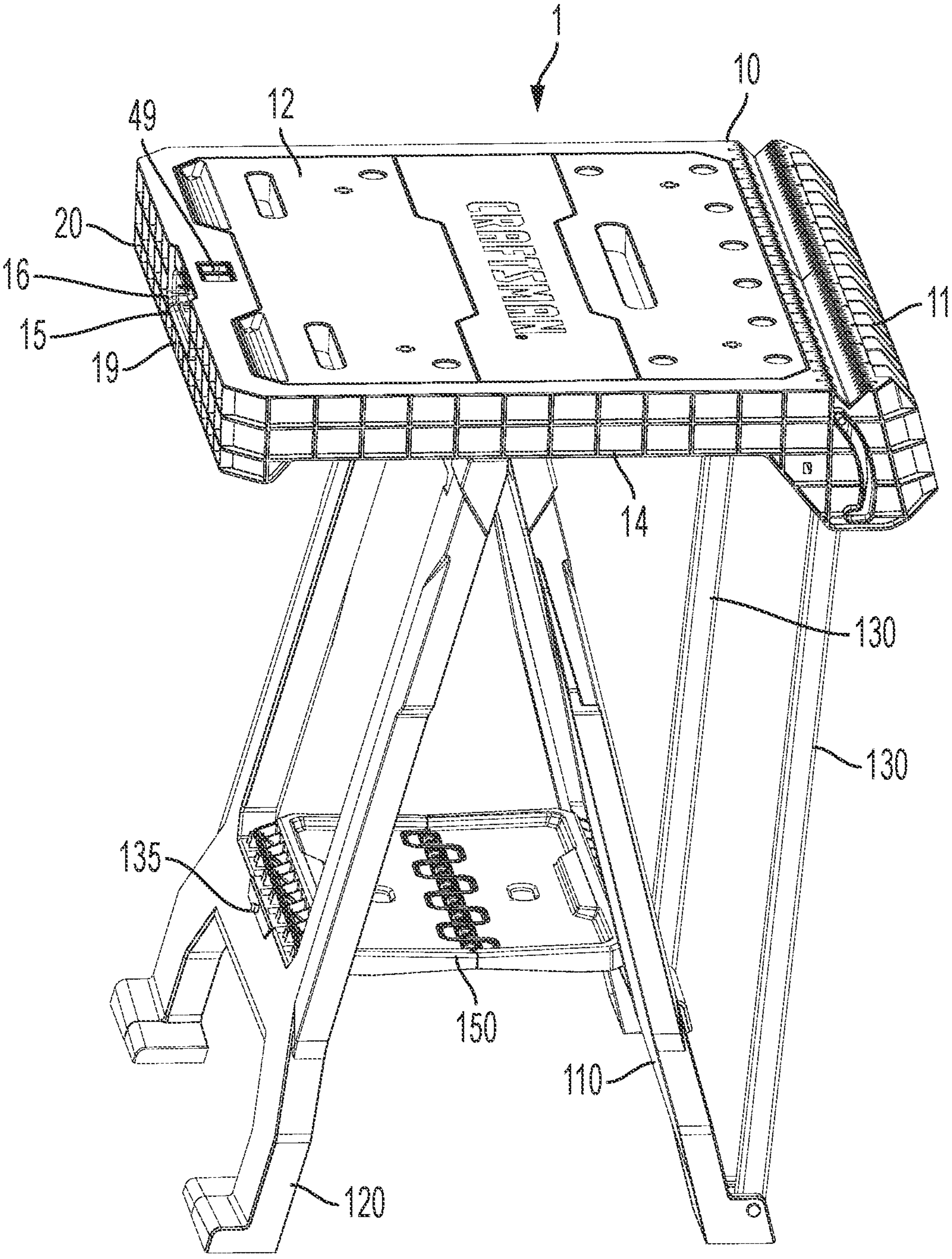
FIG. 1A is a side perspective view of a convertible sawhorse and work table in accordance with the invention.
Figure 1B:
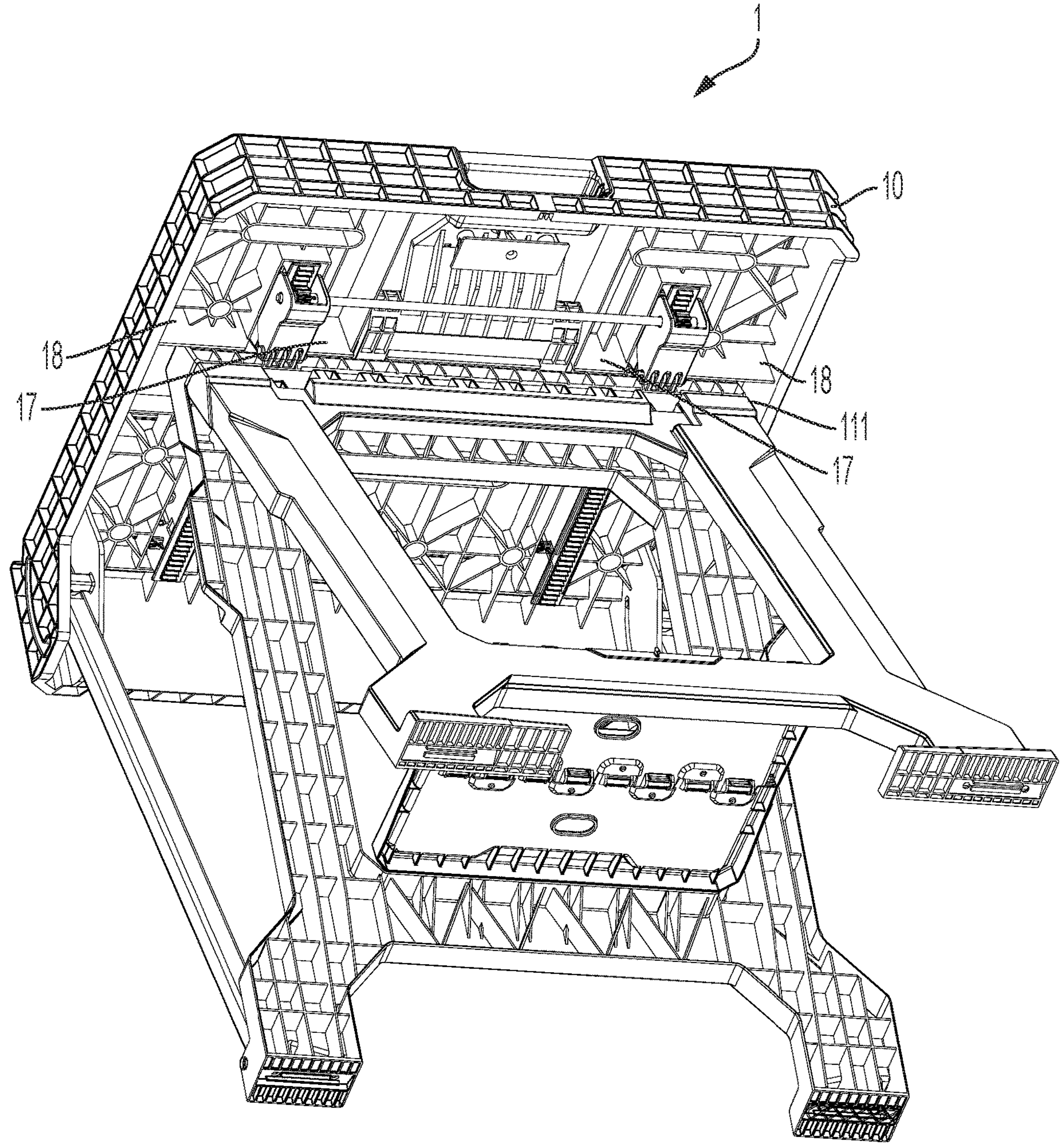
FIG. 1B is an underside perspective view of a convertible sawhorse and work table in accordance with the invention as shown in FIG. 1A.
Figure 2A:
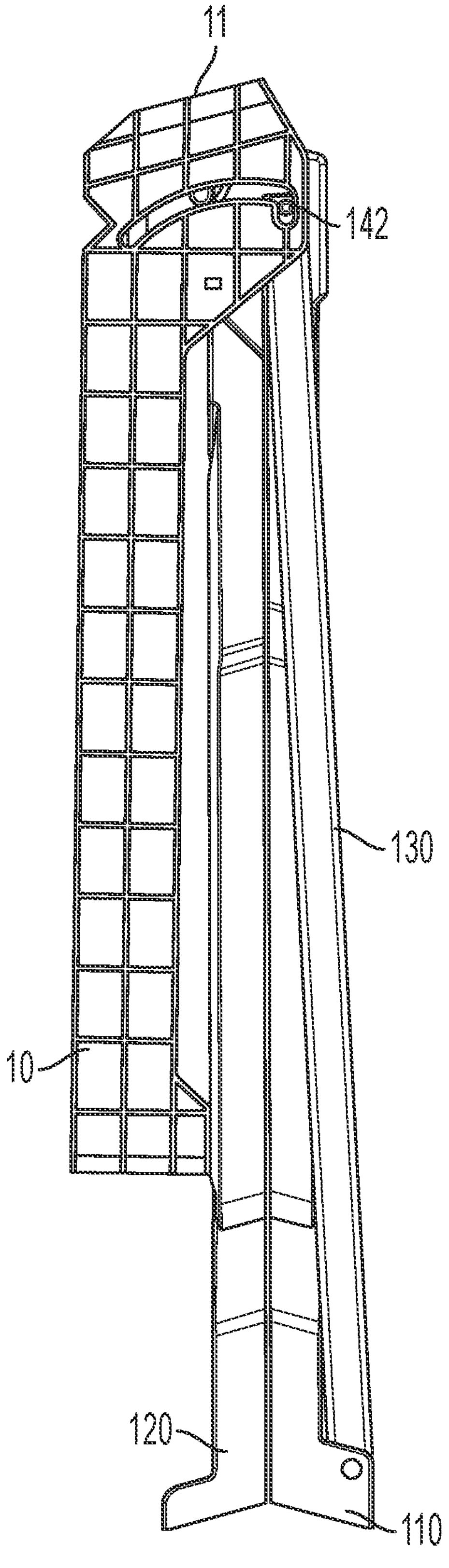
FIG. 2A is a side elevational view of the convertible sawhorse and work table as n shown in FIG. 1A in a closed position.
Figure 2B:
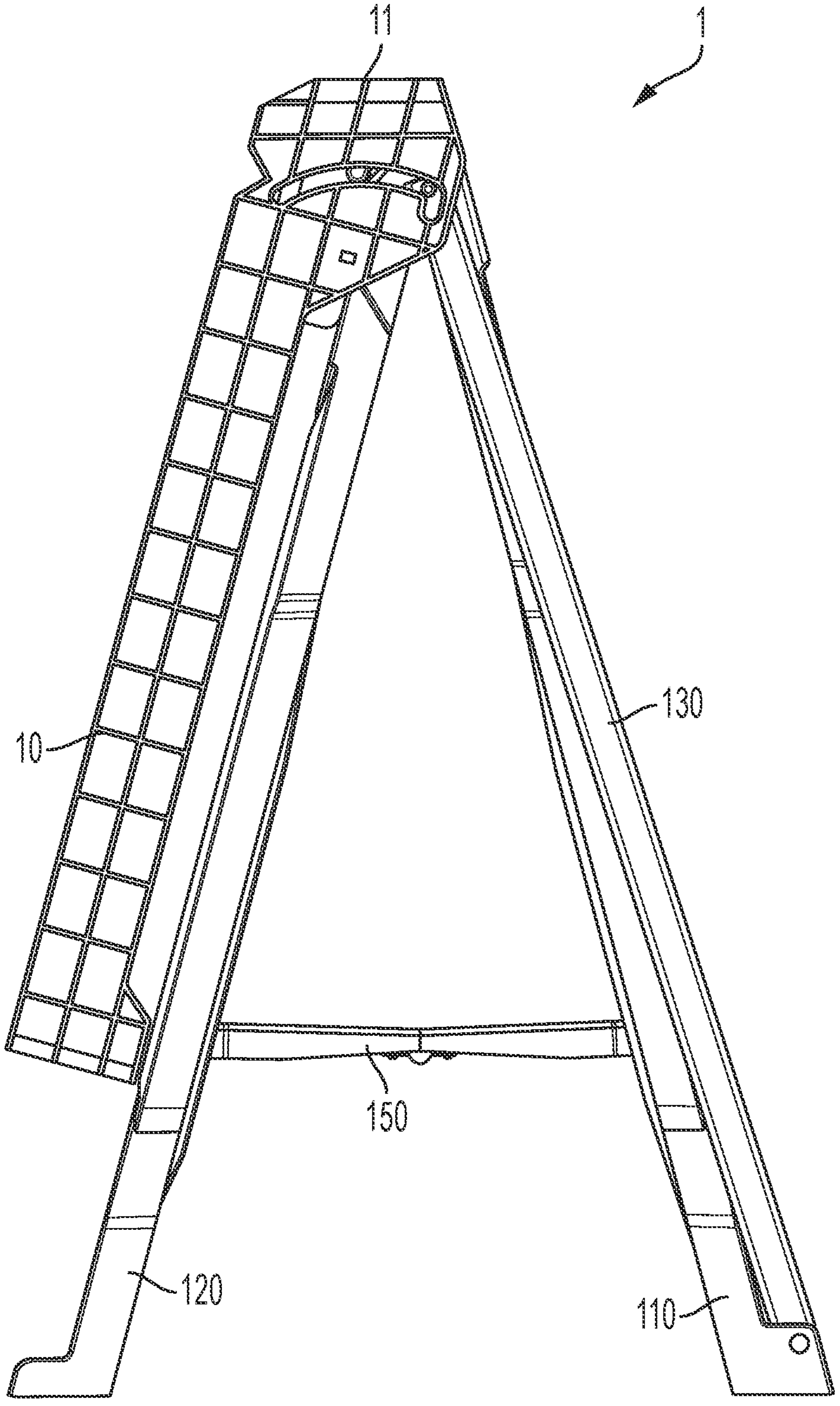
FIG. 2B is a side elevational view of the convertible sawhorse and work table as shown in FIG. 1A in the sawhorse position.
Figure 2C:
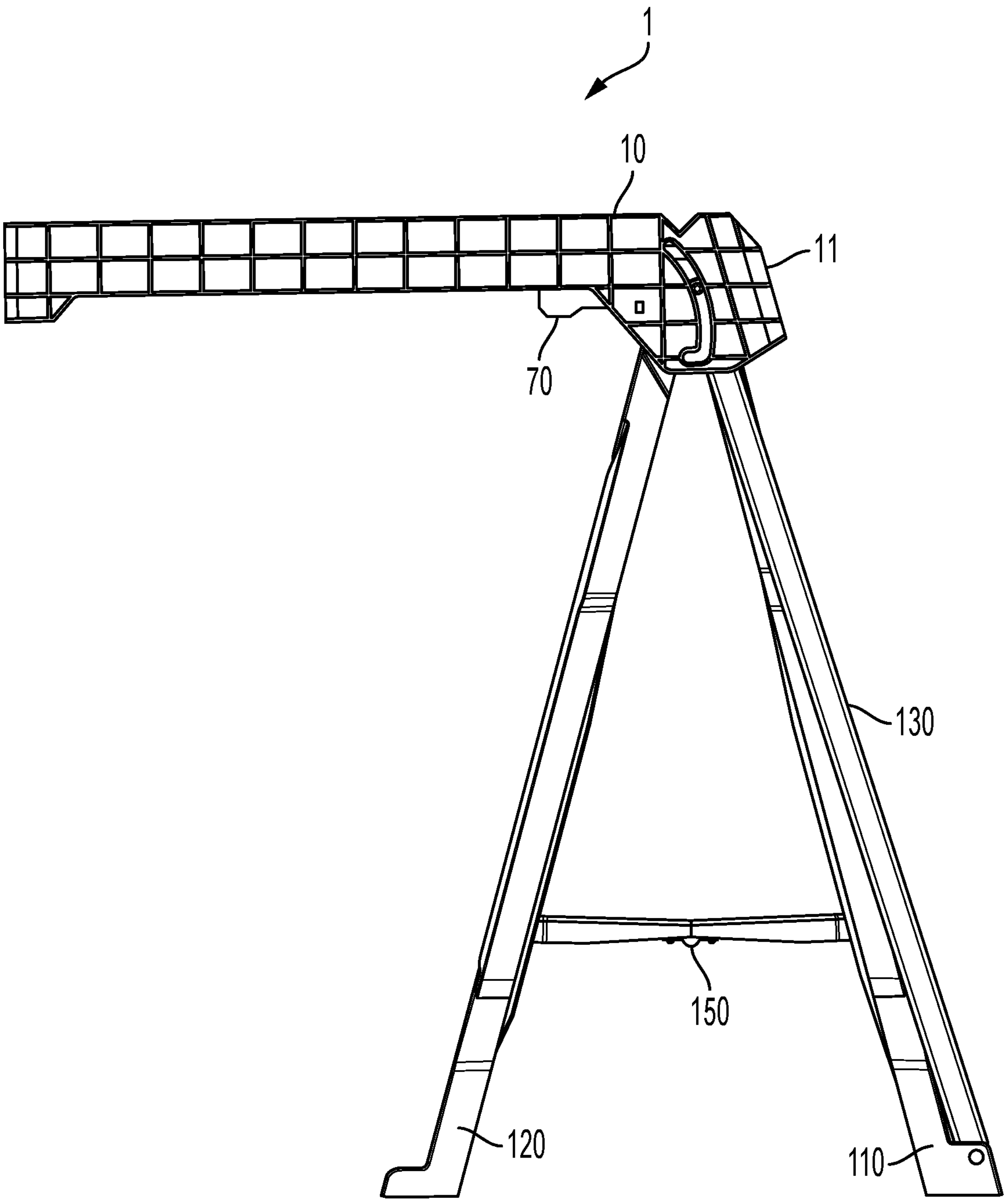
FIG. 2C is a side elevational view of the convertible sawhorse and work table as shown in FIG. 1A in a transitional position between the sawhorse position and the work table position.
Figure 2D:
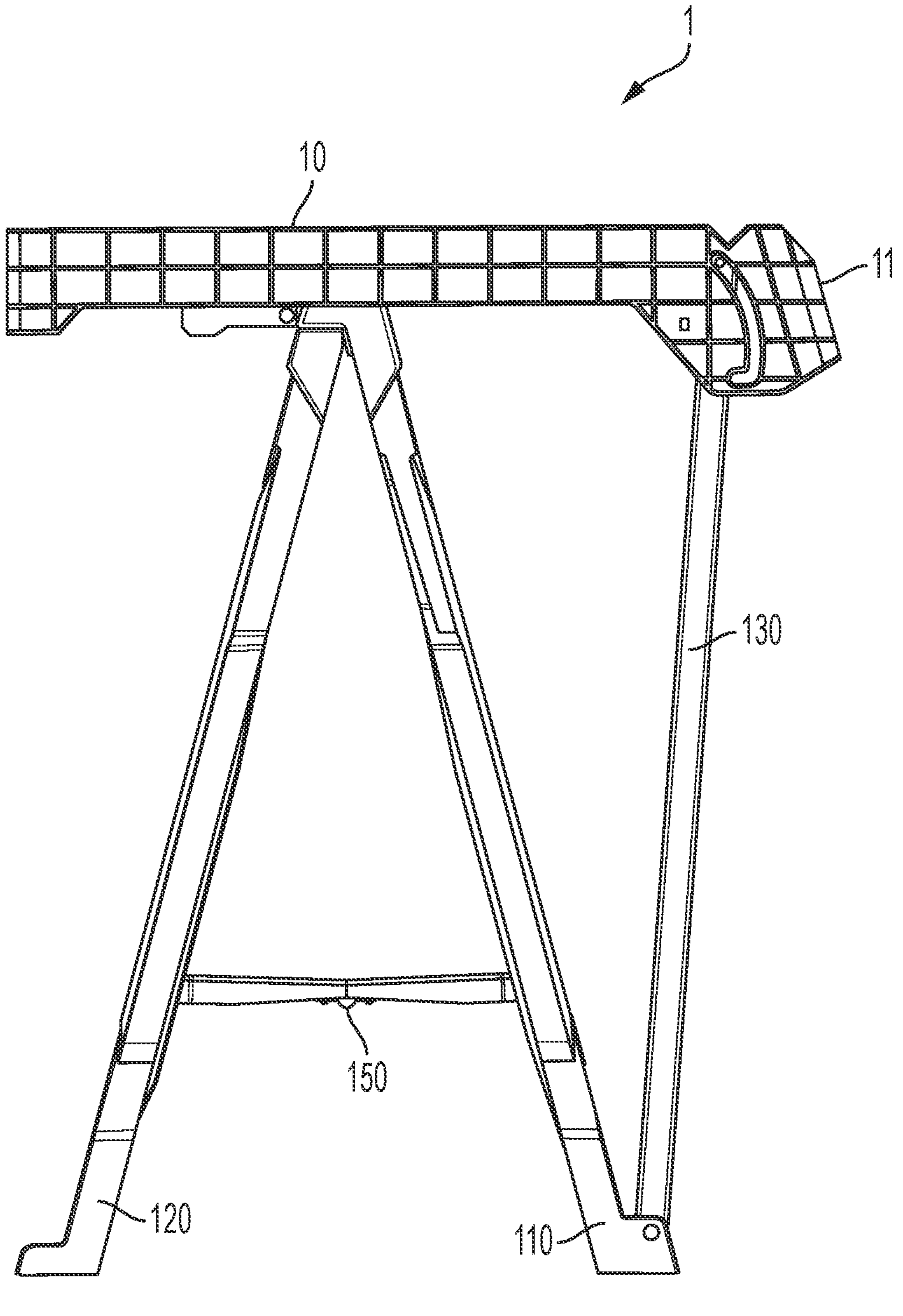
FIG. 2D is a side elevational view of the convertible sawhorse and work table shown in FIG. 1A in the work table position.
Figure 2E:
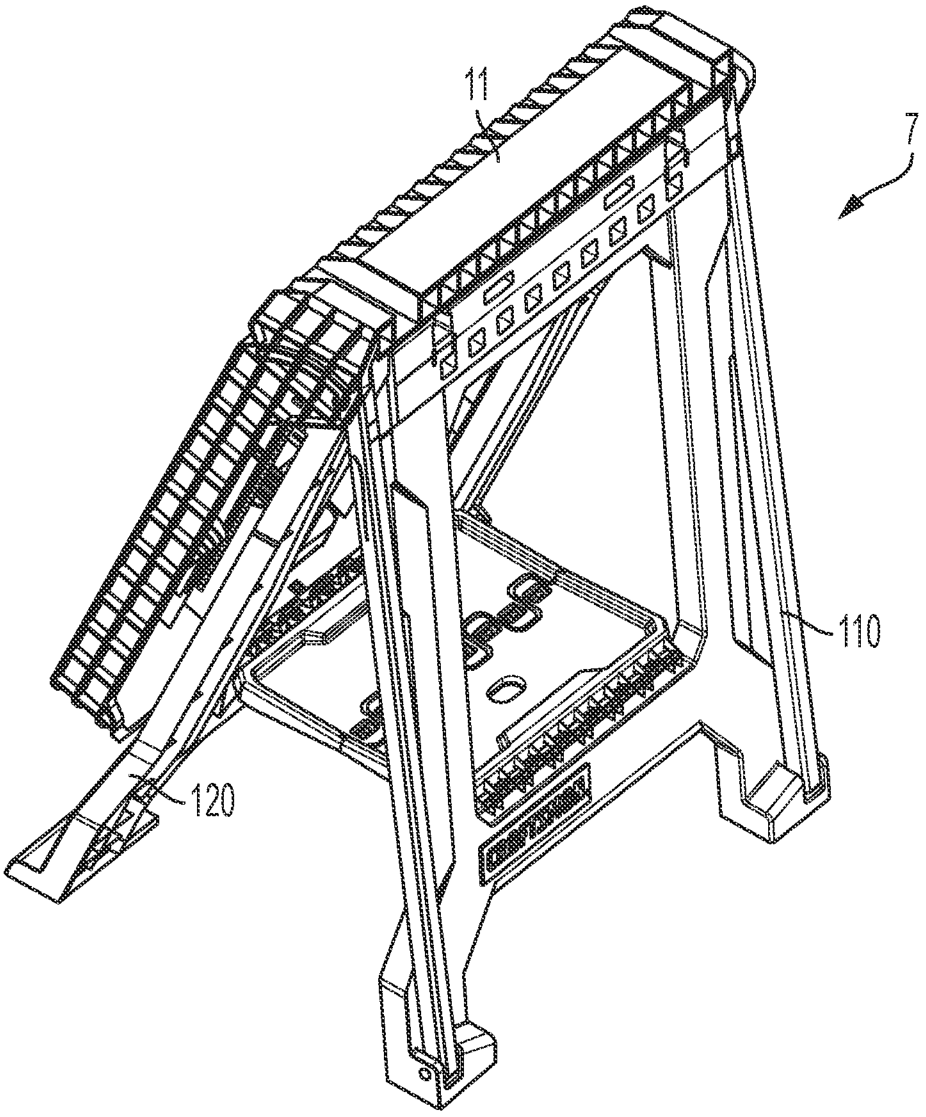
FIG. 2E is a side perspective view of the convertible sawhorse and work table in the sawhorse position as shown in FIG. 2B.

With reference to FIGS. 1 and 2A-2E, convertible sawhorse and work table 1 is shown. Convertible sawhorse and work table 1 includes worktable 10, two pivoting support rods 130, first sawhorse leg 110, second sawhorse leg 120, and tray 150 disposed between first sawhorse leg 110 and second sawhorse leg 120. In FIGS. 1 and 2D, convertible sawhorse and work table 1 is in its fully open position with upper surface 12 of worktable 10 disposed substantially horizontally and supported centrally by first sawhorse leg 110 and second sawhorse leg 120 and adjacent two corners by pivoting support rods 130. In FIG. 2A, convertible sawhorse and work table 1 is shown in a fully collapsed position with first sawhorse leg 110 and second sawhorse leg 120 disposed adjacent each other with tray 150 collapsed and fitting therebetween so as to not be shown, worktable 10 folded against second sawhorse leg 120, pivoting support rods 130 folded against first sawhorse leg 110. Worktable 10 is locked to second sawhorse leg 120 via protrusion 125 on second sawhorse leg 120 fitting within lock opening 13 formed on worktable 10 (see FIG. 3A). In FIGS. 2B and 2E, convertible sawhorse and worktable 1 is shown in an intermediate position with first sawhorse leg 110 pivoted away from second sawhorse leg 120 to support the structure, tray 150 unfolded therebetween, and worktable 10 disposed adjacent second sawhorse leg 120. In this position, rear wall 11 of worktable 10 is horizontally disposed and overlies the top surface of first sawhorse leg 110, which itself overlaps the top surface of second sawhorse leg 120, and the outer surface there of functions as a sawhorse surface. FIG. 2C shows an intermediate position in which convertible sawhorse and work table 1 is being moved between the positions shown in FIG. 2B and FIG. 2D.

Figure 3A:
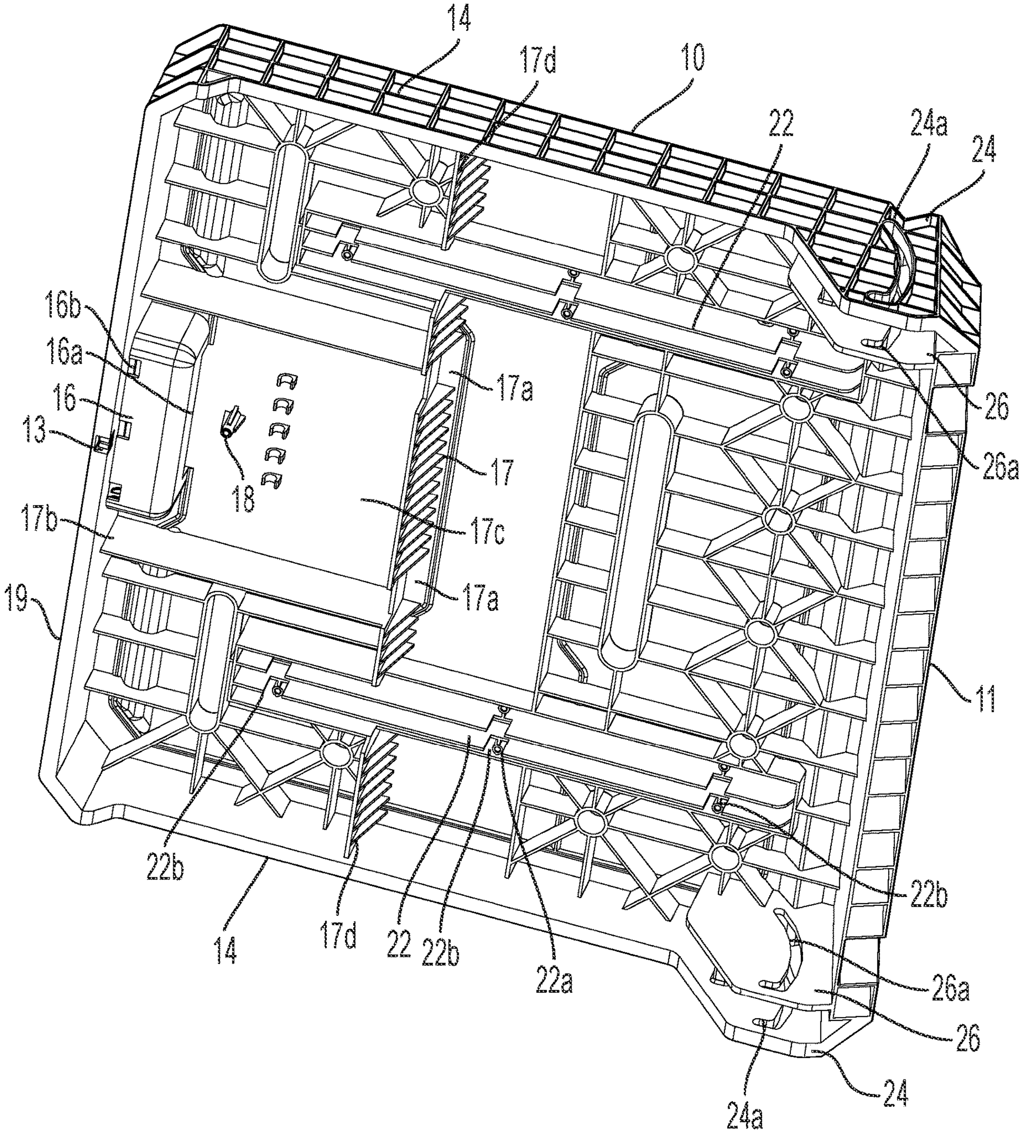
FIG. 3A is an underside perspective view of a work table forming part of the convertible sawhorse and work table shown in FIG. 1A.
Figure 3B:
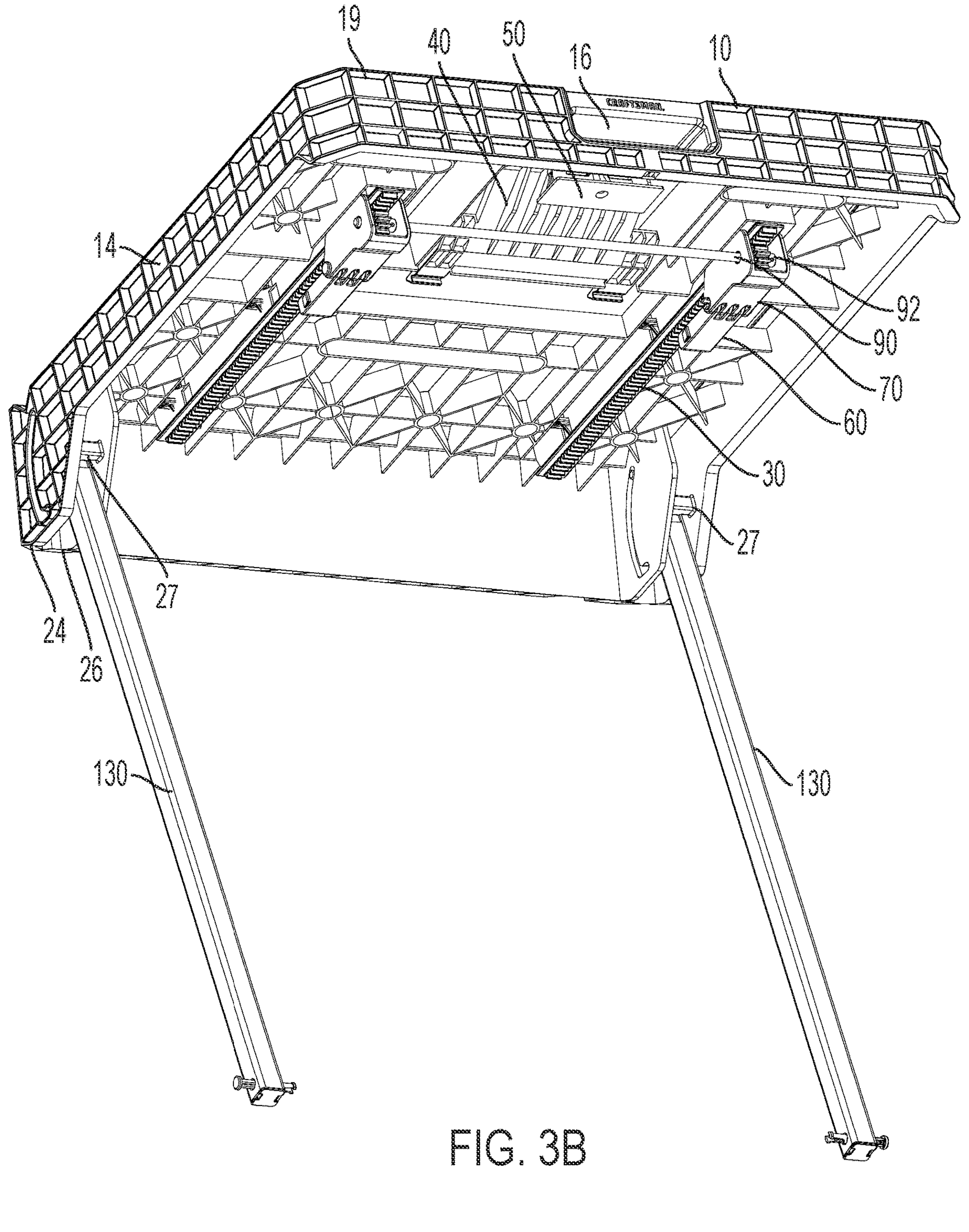
FIG. 3B is an underside perspective view of the work table shown in FIG. 3A from a second direction and further showing the support rods forming part of the convertible sawhorse and work table.

With further reference to FIGS. 3A and FIG. 3B, further details of worktable 10 and in particular the underside thereof are disclosed. Worktable 10 includes upper work surface 12 and front wall 19 and two side walls 14 extending downwardly therefrom. Rear wall 11 includes a slanted upper surface, an intermediate surface angled with respect to the upper surface and a lower surface at a further angle, and as noted above the upper surface may serves as the sawhorse surface when the assembly is in the sawhorse configuration. Rack channels 22 are formed by walls extending downwardly from the lower surface in a generally longitudinal direction between from a position rearward of front wall 19 to a position forward of rear wall 11 and are generally parallel to side walls 14 and disposed laterally inwardly thereof. Each rack channel 22 is formed by two walls each having three square shaped slots 22*b* at the lower ends. Screw-threaded projections 22*a* are formed on the lower surface of worktable 10 above the location of slots 22. Various circular and oblong slots may be formed through worktable 10.

Worktable 10 further includes handle receiving portion 16 which includes an opening formed through front wall 19. The rear surface of handle receiving portion 16 includes through channel 16*a*. The lower surface of handle receiving portion 16 includes three through slots 16*a*. Handle 15, (shown in FIGS. 4A, 4B and 5A) includes three protrusions which are snap fitted into slots 16*a* to secure handle 15 in handle receiving portion 16. Louvered support walls 17 extends downwardly from the lower surface of work surface 12 and includes two through slots 17*a*. Support wall 17 along with two side walls 17*b* define a generally square region 17*c* into which push button 40 is received. Screw-threaded projection 18 extends downwardly from the lower surface of work surface 12 behind handle receiving portion 16 and within region 17*c*. Push button opening 20 (see FIG. 1A) is formed through work surface 12 at a location above handle receiving portion 16. Further lateral walls 17*d* extend transversely from the laterally outward sides of rack channels 22 to the inner surface of each side wall 14. Lock opening 13 is which may include two spring loaded tabs is formed in the lower surface of front wall 19 below handle receiving portion 16.

Figure 3C:
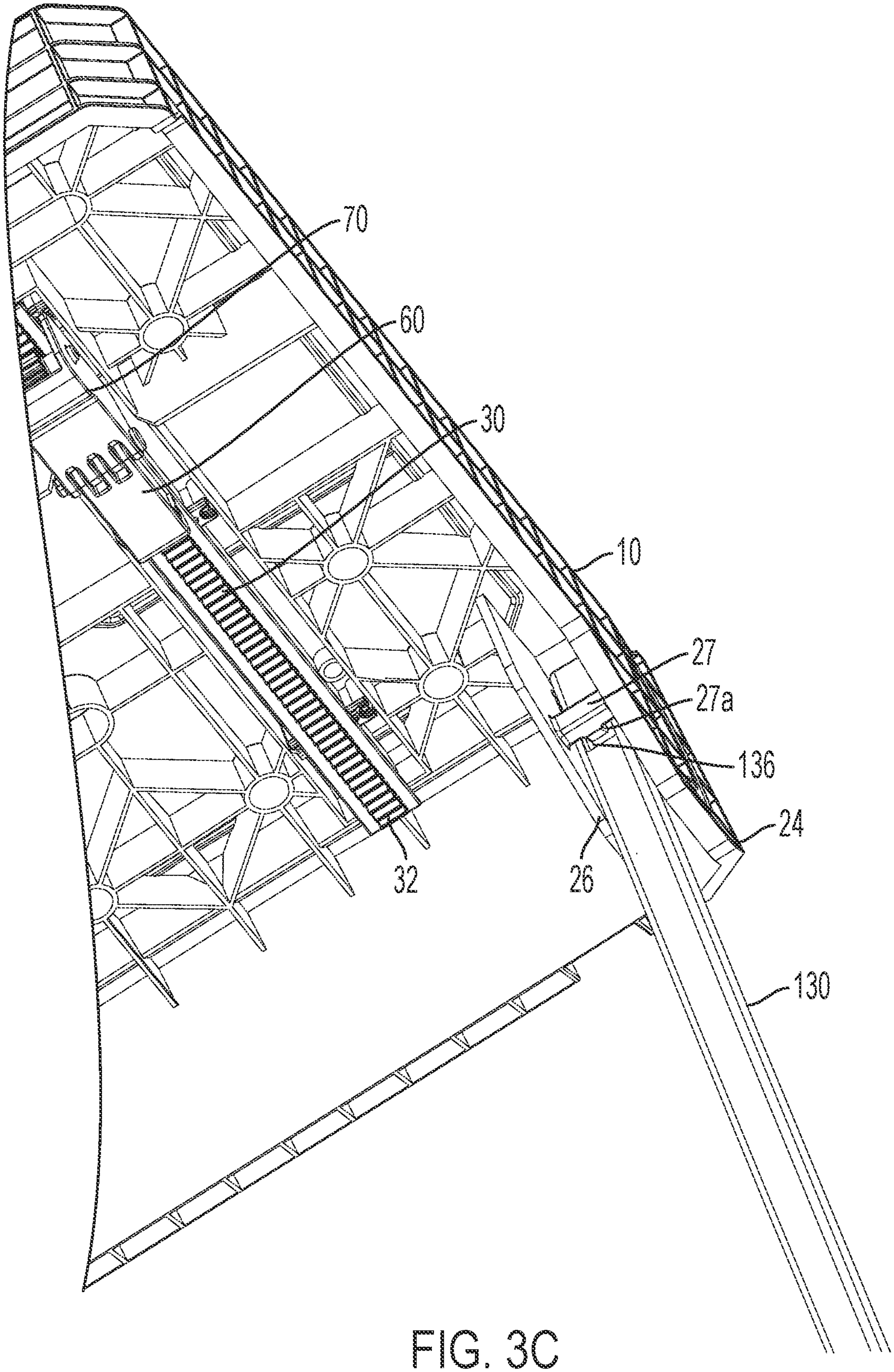
FIG. 3C is a closeup underside perspective view showing a portion of the work table as shown in FIG. 3B.

Worktable 10 further includes outer flanges 24 and inner flanges 26 extending downwardly from work surface 12 at the rear corners thereof, generally forward of rear wall 11. Each outer flange 24 includes a C-shaped channel 24*a* and each inner flange 26 includes C-shaped channel 26*a* formed therethrough. Each of a pair of channels 24*a* and 26*a* are aligned with each other to form a single travel channel which will hereinafter be denoted as slide channel 24*a*/26*a*. As best shown in FIGS. 3B and 3C, cross rods 27 extend between each of a pair of outer flange 24 and inner flange 26 at a location midway along channels 24*a* and 26*a*. Geometric tooth 27*a* extends from each rod 27, generally rearwardly towards rear wall 11.

Figure 18A:
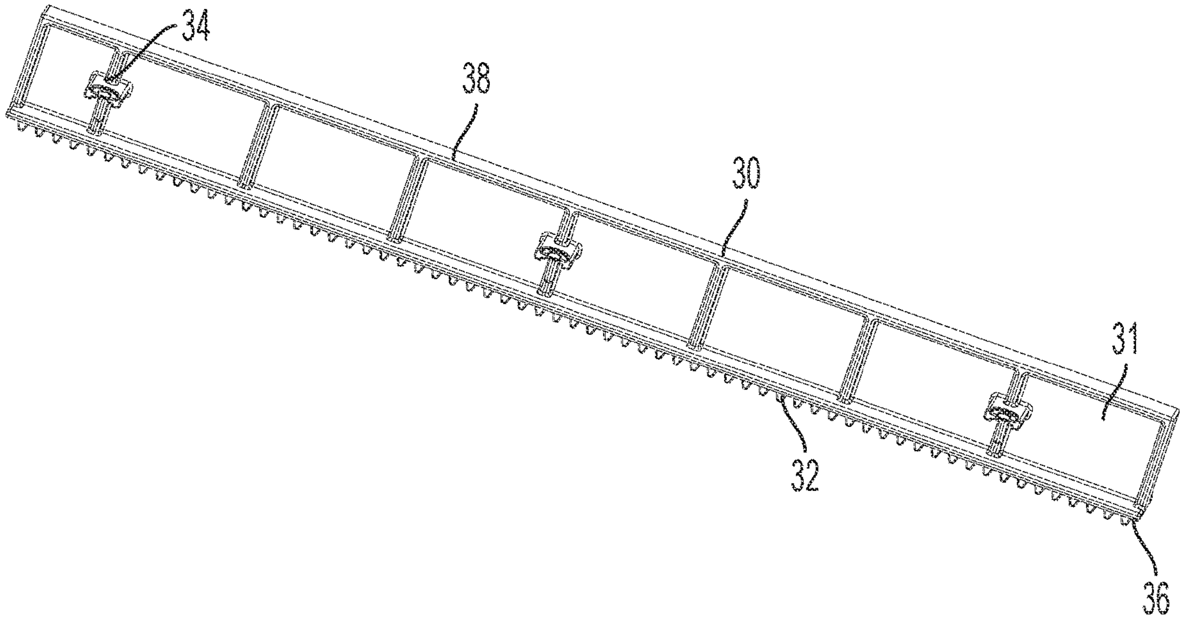
FIG. 18A is a perspective view of a rack forming part of the convertible sawhorse and work table as shown in FIG. 1A.
Figure 18B:
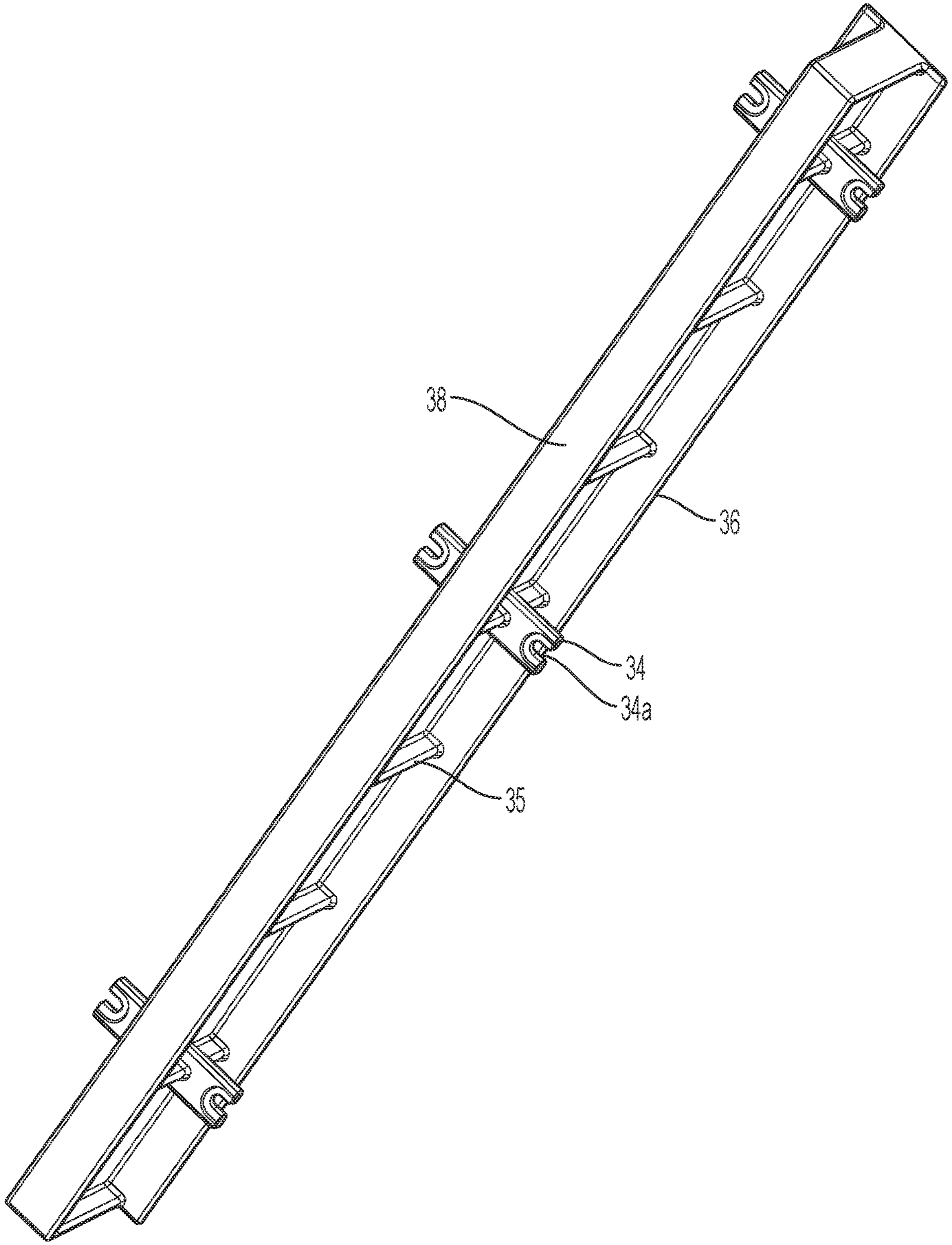
FIG. 18B is an overhead perspective view of the rack shown in FIG. 18A.

With further reference to FIGS. 18A and 18B, rack 30 is further disclosed. Rack 30 includes lower wall 36 and upper wall 38 with primary wall 31 extending therebetween. Lower wall 36 extends outwardly from primary wall 31 to a greater extent than upper wall 38 so as to give rack 30 an overall inverted T-shaped configuration. Rack teeth 32 are formed on lower wall 36. Strengthening ribs 35 extending between lower wall 36 and upper wall 38. Tabs 34 extend laterally from three of ribs 35 and include semi-circular screw openings 34*a*. With reference to FIGS. 3B and 3C, racks 30 are disposed in rack channels 22 of worktable 10 with tabs 34 fitting within square shaped slots 22*b*. Racks 30 are secured to worktable 10 by screws (not shown) which fit through openings 34*a* and into screw-threaded projections 22*a*.

Figure 7A:
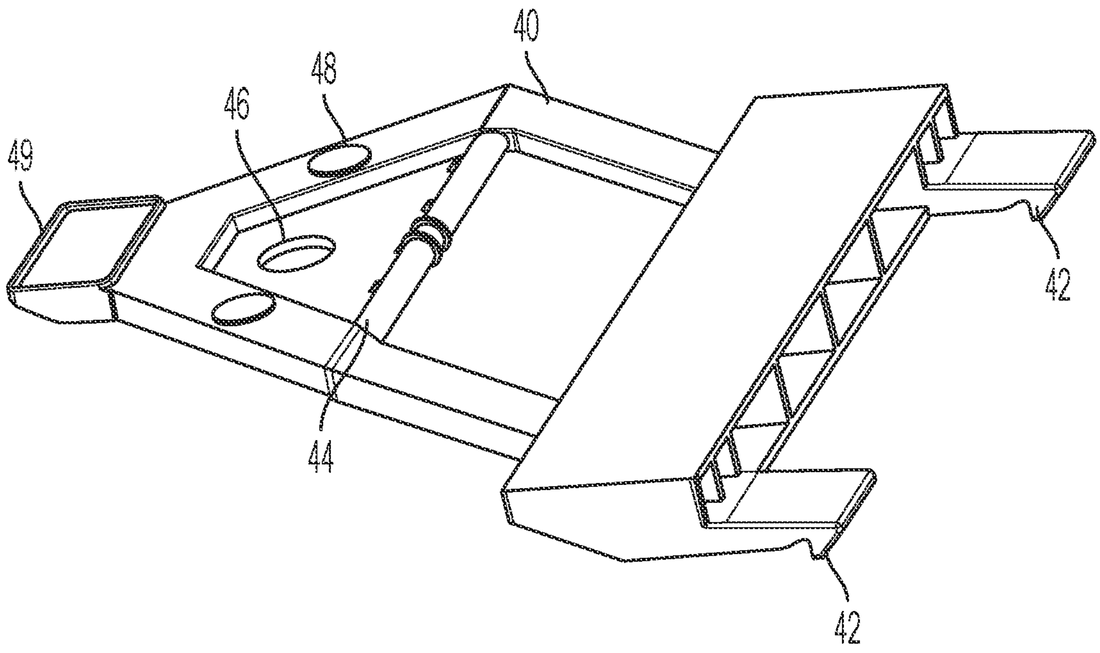
FIG. 7A is a top perspective view of the push button forming part of the convertible sawhorse and work table as shown in FIG. 1A.
Figure 7B:
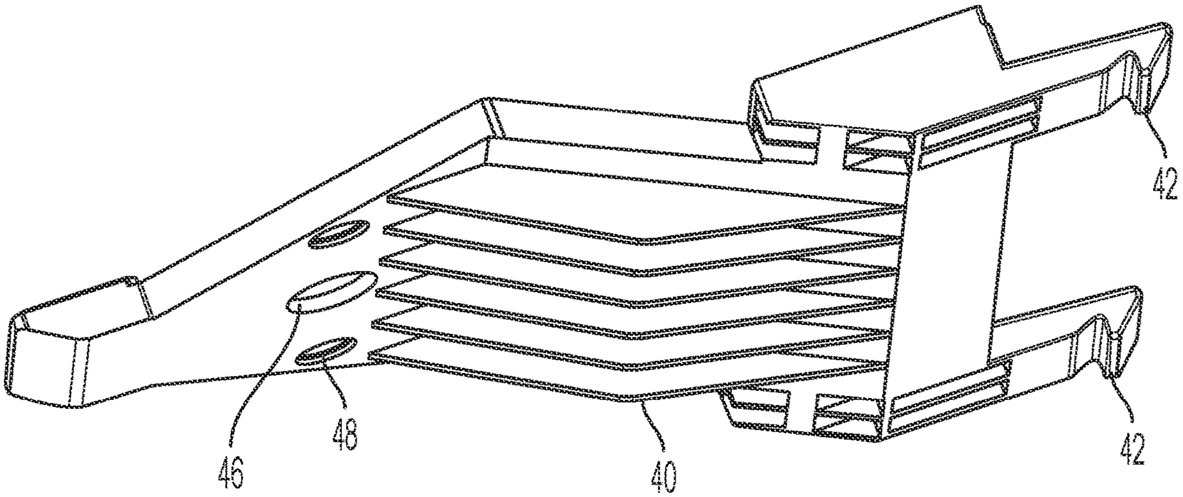
FIG. 7B is an underside perspective view of the push button shown in FIG. 7A.

With reference to FIGS. 7A and 7B, push button 40 is disclosed. Push button 40 includes a main body portion having a cylindrical pivot axis 44 formed transversely across an upper surface at a generally midway location. Push tab or surface 49 is formed at a forward end of push button 40. Through hole 46 and raised, non-through openings 48 are formed between axis 44 and push surface 49. Two hooked push button teeth 42 extend from the rear of push button 44. With further reference to FIGS. 3A, 3B, 4B and 5A-5C, push button 40 is disposed adjacent the lower surface of work-surface 12 of worktable 10 within square region 17*c*. Push tab 49 is fitted through channel 16*a* formed in handle receiving portion 16 and is disposed in push button opening 20 in worktable 10. Screw threaded projection 18 fits within through hole 46. Teeth 42 extend through support wall openings 17*a*. Pivot axis 44 snap fits within four semi-circular downward projections 18*a* formed on the lower surface of work surface 12 to pivotably secure push button 40 to worktable 10.

Figure 4A:
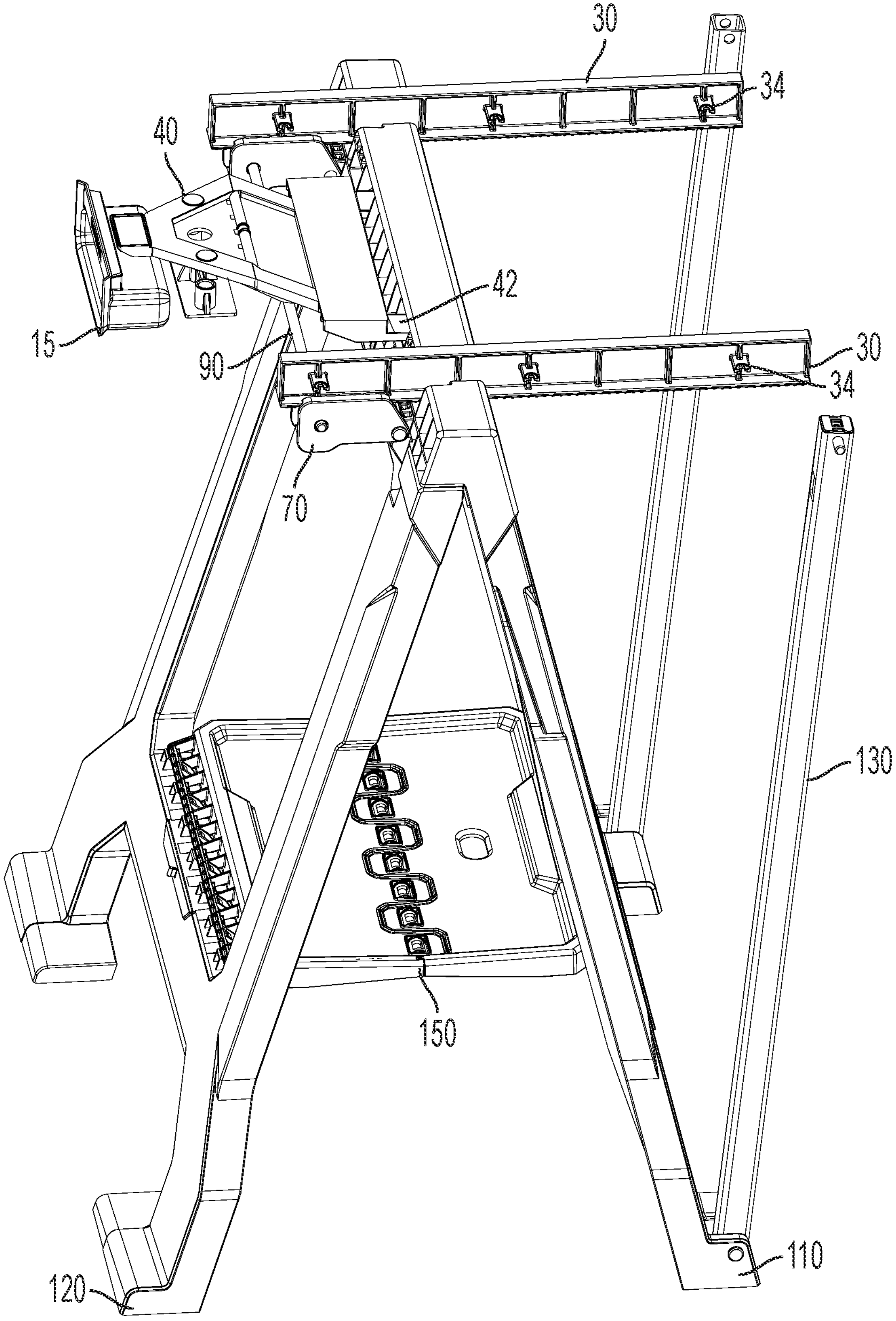
FIG. 4A is a perspective view showing elements of the convertible sawhorse and work table shown in FIG. 1A with the worktable not shown.
Figure 5A:
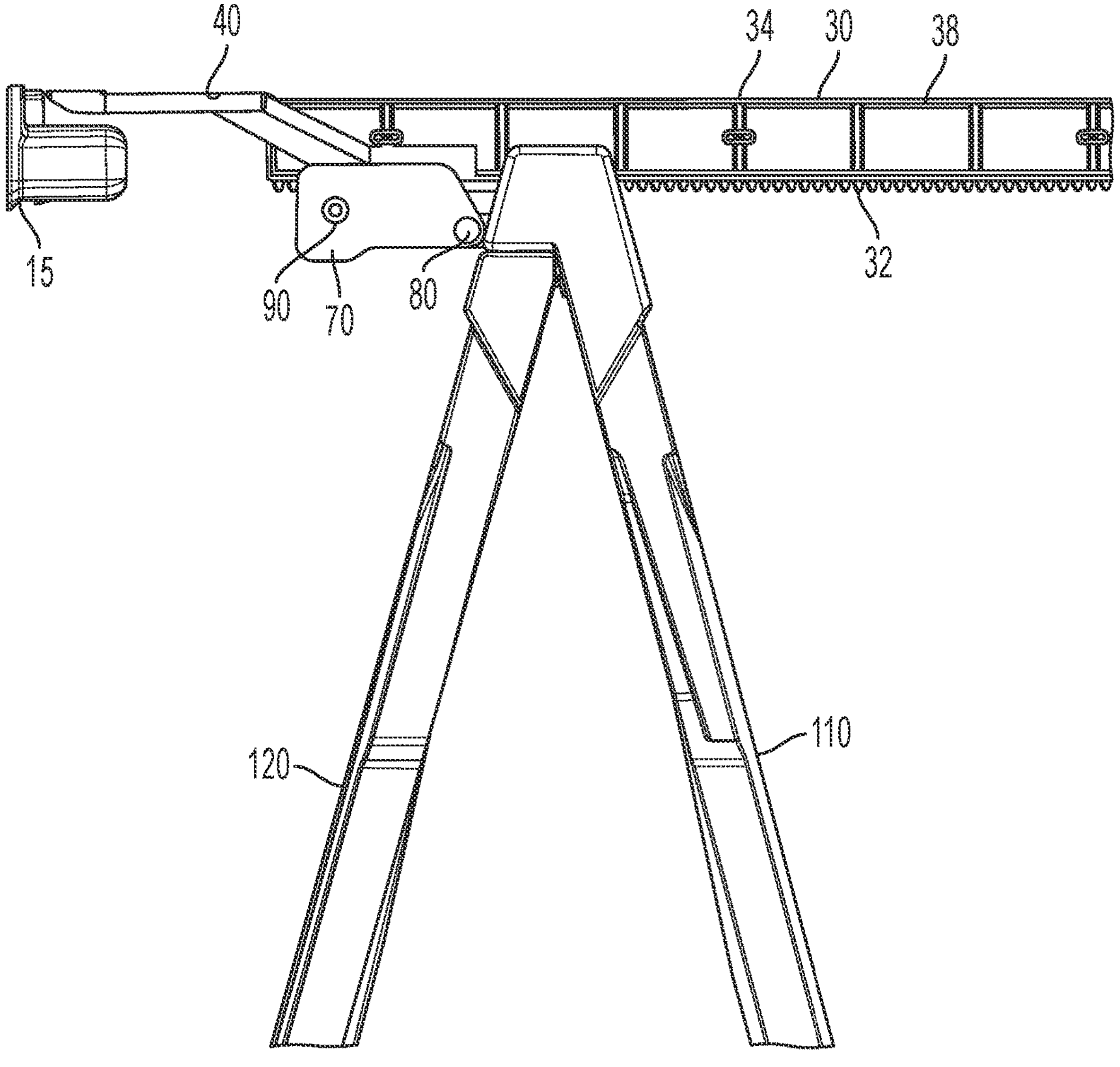
FIG. 5A is a close up side elevation view of several elements of the convertible sawhorse and work table as shown in FIG. 4B.
Figure 5B:
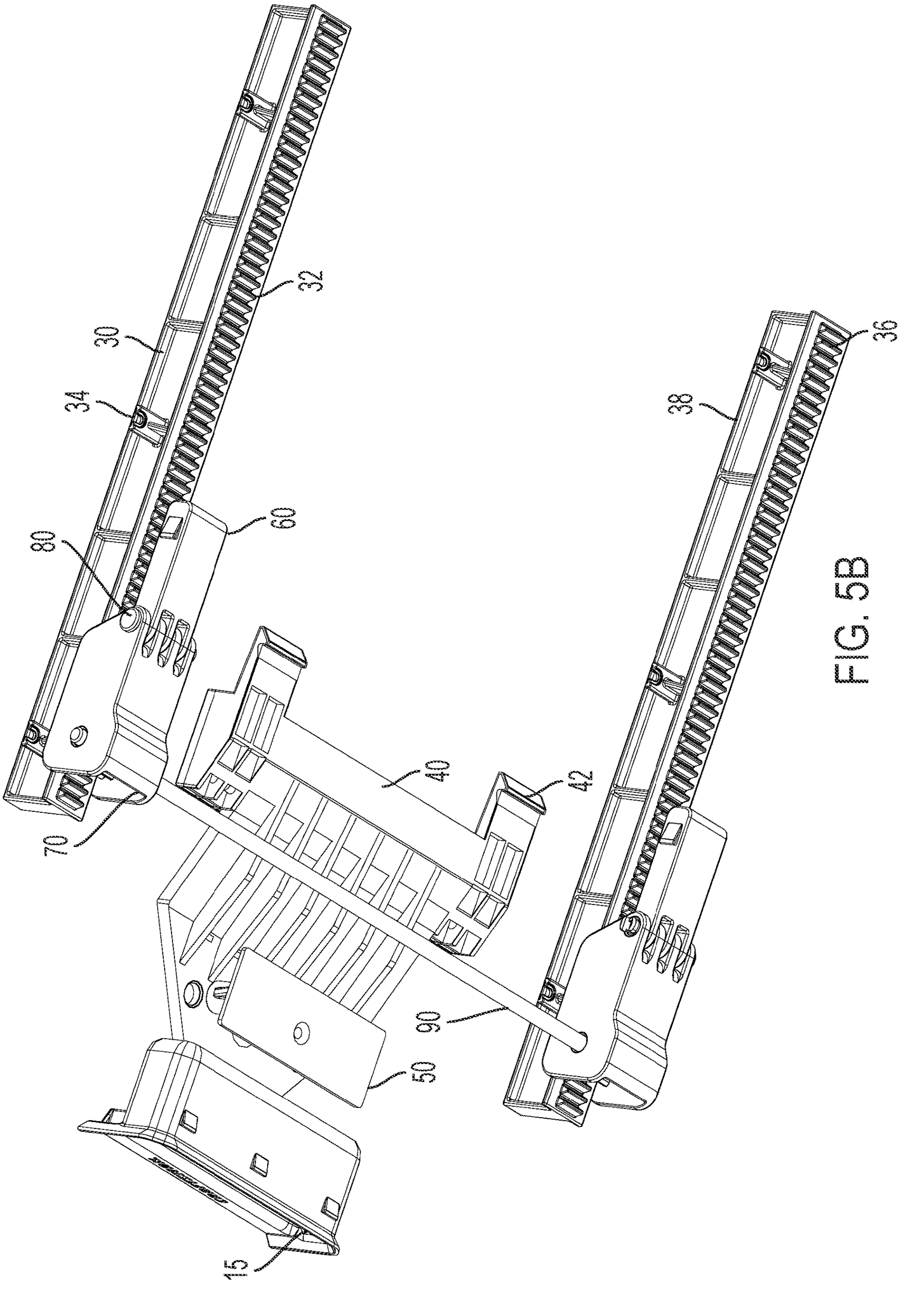
FIG. 5B is an underside perspective view showing several elements of the convertible sawhorse and work table as shown in FIG. 1A.
Figure 5C:
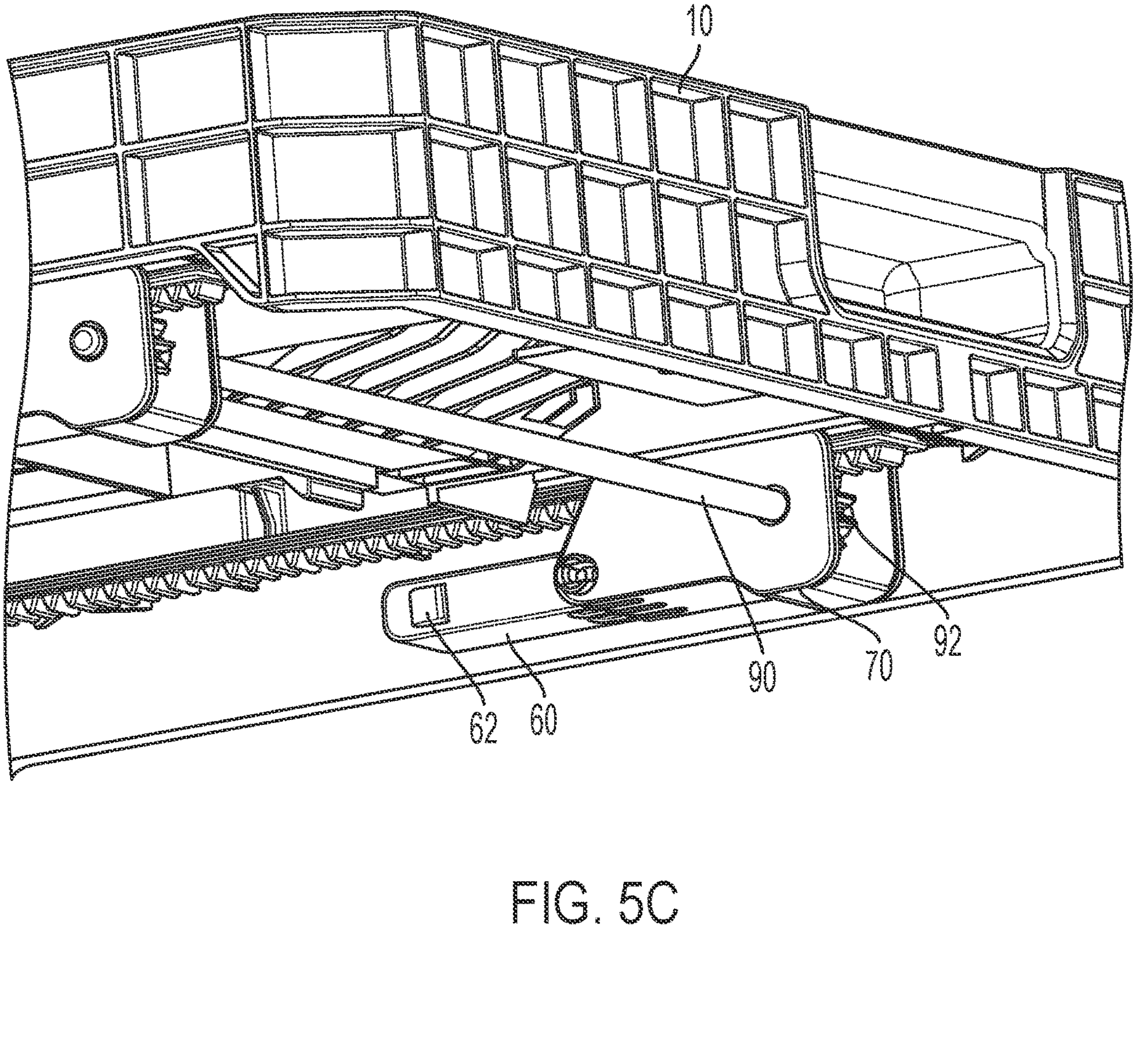
FIG. 5C is a closeup underside perspective view showing several elements of the convertible sawhorse and work table as shown in FIG. 1A.
Figure 5D:
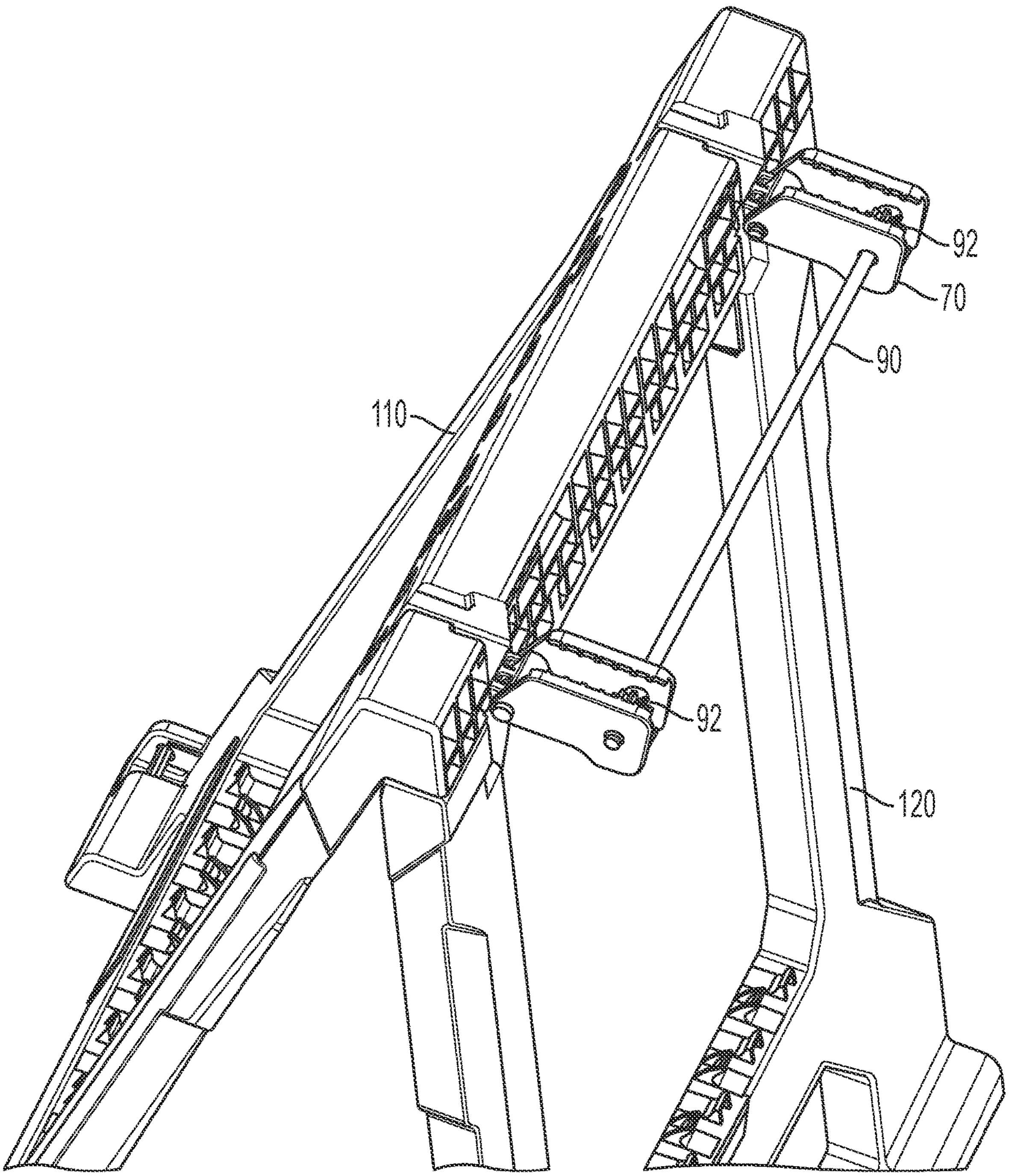
FIG. 5D is an overhead perspective view of the convertible sawhorse and work table as shown in FIG. 1A showing several elements thereof with the worktable not shown.
Figure 19:
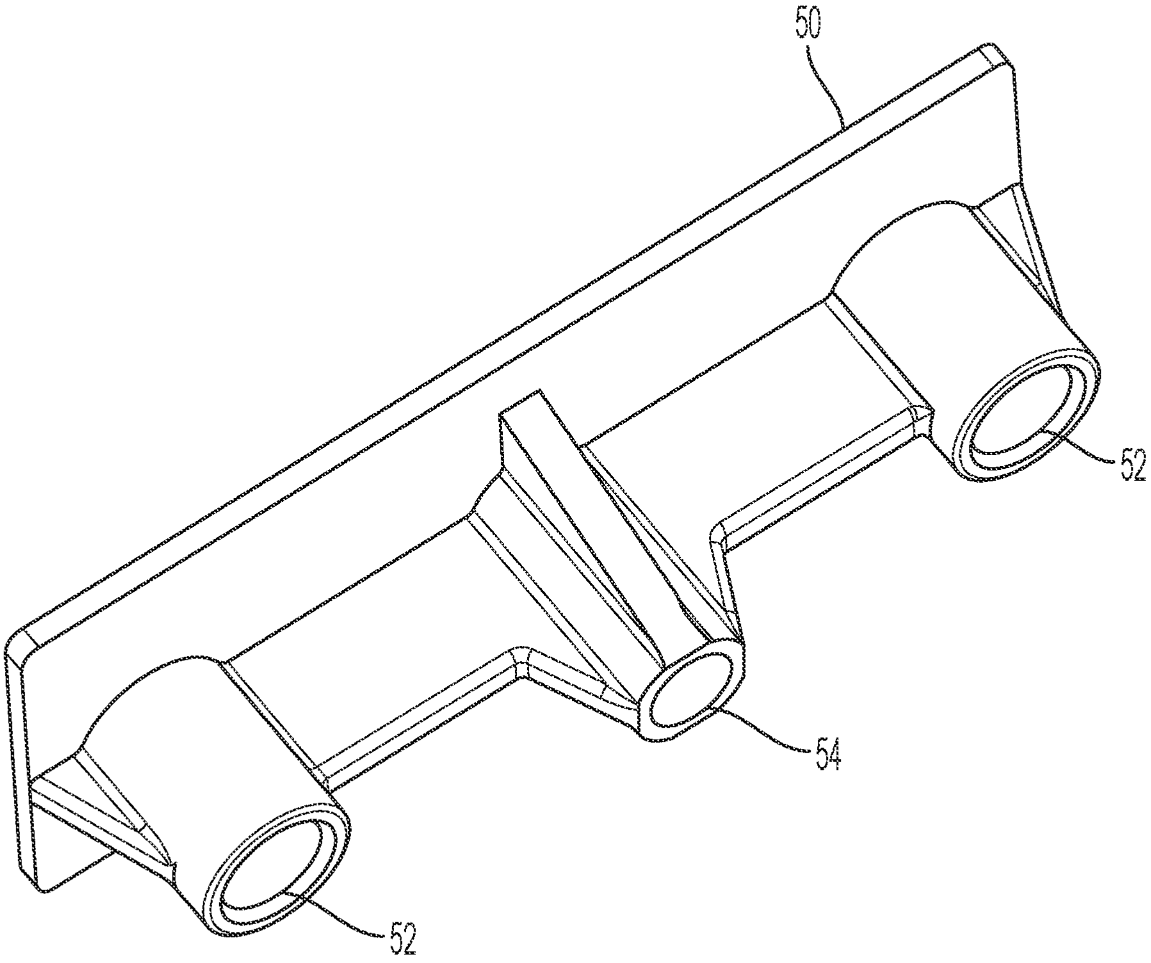
FIG. 19 is a perspective view of a push button lock cover forming part of the convertible sawhorse and work table as shown in FIG. 1A.

With further reference to FIG. 19, push button lock cover 50 is disclosed. Lock cover 50 includes two hollow cylinders 52 on either side and lock cover screw column 54 centrally located therebetween. With reference to FIGS. 3B, 4A and 5B, lock cover 50 is disposed beneath push button 40, with lock cover screw column 54 disposed through hole 46 and received about screw threaded projection 18. A screw secures lock cover 50 to the lower surface of work surface 12 of worktable 10, with push button 40 disposed therebetween. Springs are secured within hollow cylinders 52, in contact with the lower surfaces of non-through openings 48 of push button 40, to thereby bias push button 40 upwardly forward of axis 44, with push tab 49 thereby raised to an upper most location within opening 20, and teeth 42 biased downwardly. Therefore, pushing tab 49 causes push button 40 to pivot about axis 44 and raises teeth 42 upwardly.

Figure 8A:
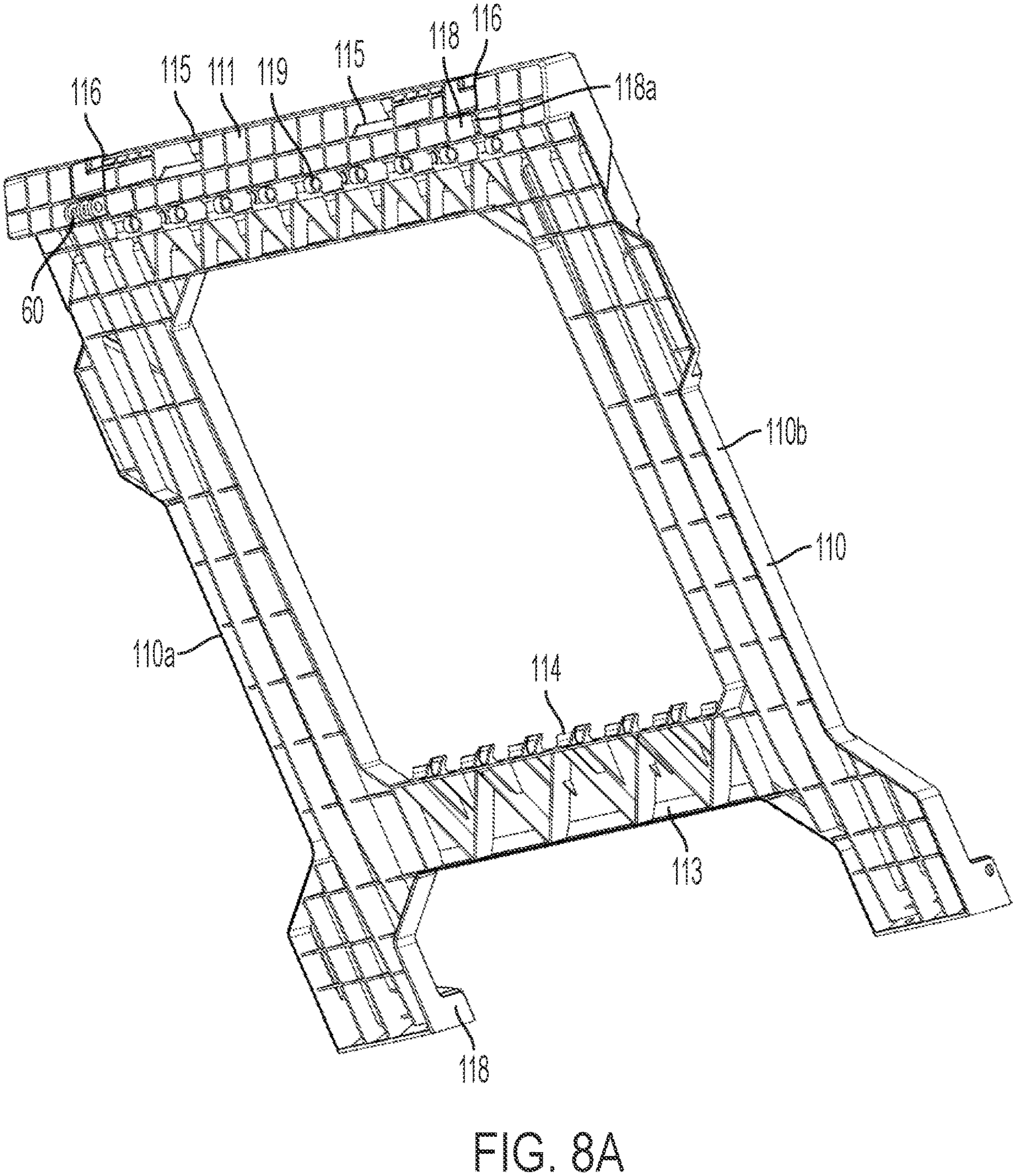
FIG. 8A is a side perspective view of a first sawhorse leg forming part of the convertible sawhorse and work table as shown in FIG. 1A.
Figure 8B:
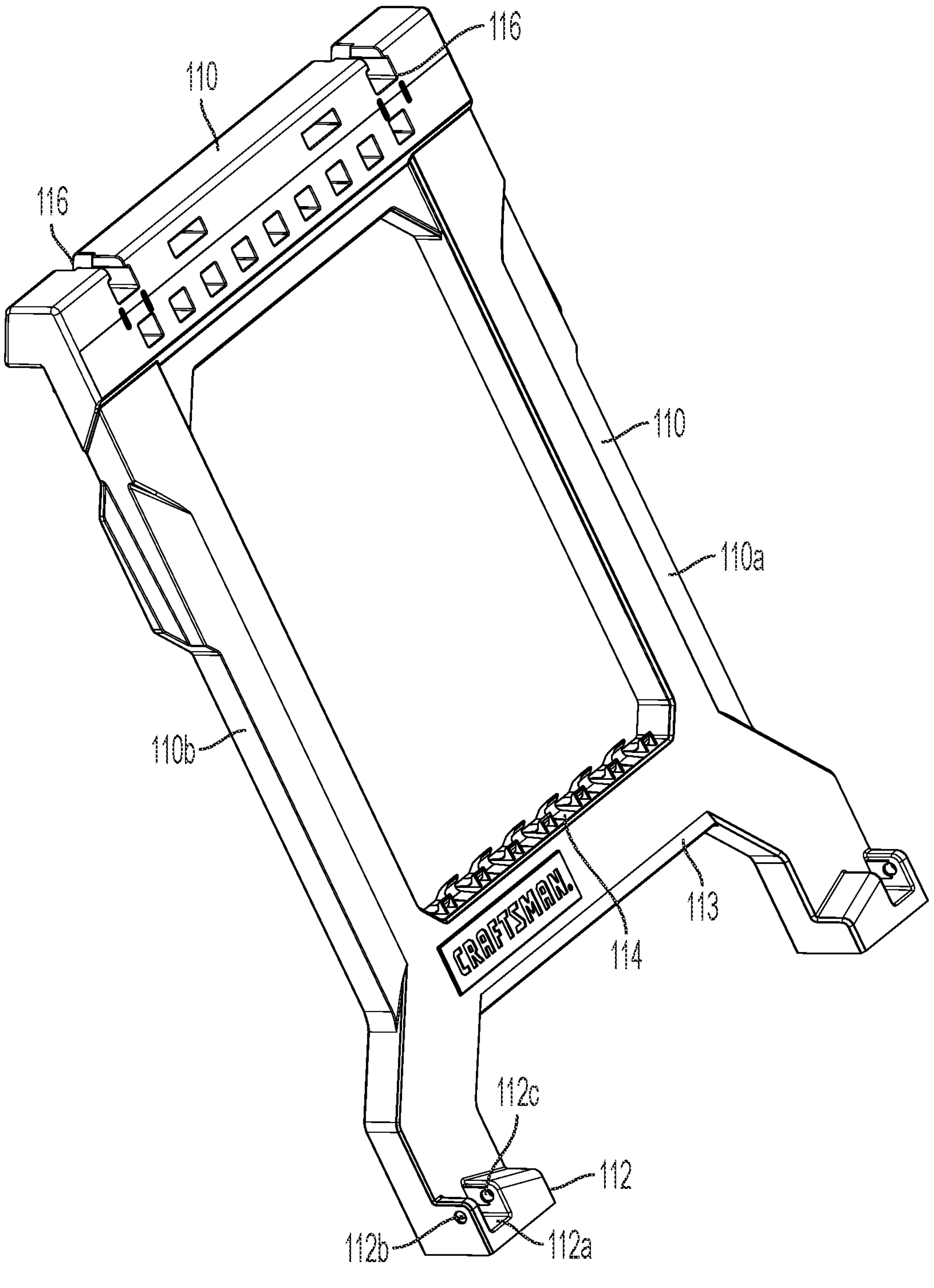
FIG. 8B is an opposite side perspective view of the first sawhorse leg shown in FIG. 8A.

With reference to FIGS. 8A and 8B, first sawhorse leg 110 is disclosed. First sawhorse leg 110 includes side leg elements 110*a* and 110*b* extending vertically, and upper leg element 111 and lower leg element 113 extending laterally therebetween. Upper leg element 111 includes a pair of rack slots 116 formed adjacent and extending through the side ends approximately above or just inward of leg elements 110*a* and 110*b*. Rack retaining projections 117 project into rack slots 116 at an upper open end. Openings 118 are formed on an inward surface of upper leg element 111, at a location just below rack slots 116. As will be discussed further below, one slider base 60 is disposed within each opening 118, and one such slider base 60 is shown in FIG. 8A. Raised rearwardly hooked teeth 115 are formed in further openings of upper leg element 111, laterally inward of and at a location above each opening 118. Multiple circular through hole projections 119, for example ten such projections, extend inwardly from upper leg element 111, are spaced from each other, and extend laterally across the inner surface. Curved teeth 114 project upwardly from lower leg element 113, are spaced from each other, and face towards a common axis in an alternating arrangement, that is, the curved outer side of teeth 114 alternately face the forward or rearward direction relative to lower leg element 113. Side leg elements 110*a* and 110*b* each extend outwardly downwardly from lower leg element 113 into feet 112. Each foot 112 includes foot slot 112*a*. Circular through opening 112*b* is formed in foot 112 outwardly of slot 112*a* and corresponding circular opening 112*c* extends within foot 112 on the other side of slot 112*a*. A ledge is formed behind opening 112*c* with foot 112.

Figure 9A:
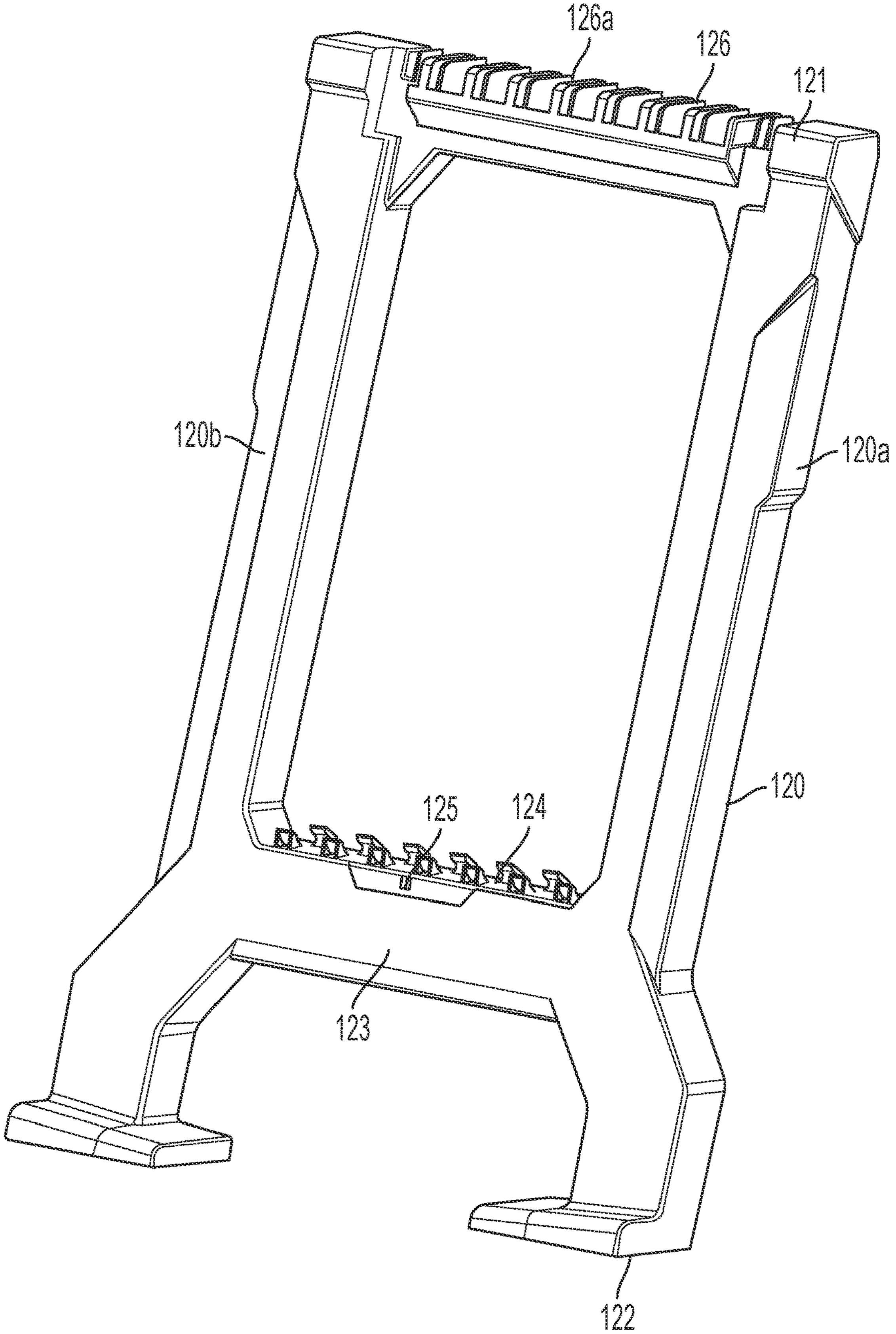
FIG. 9A is a side perspective view of a second sawhorse leg forming part of the of the convertible sawhorse and work table as shown in FIG. 1A.
Figure 9B:
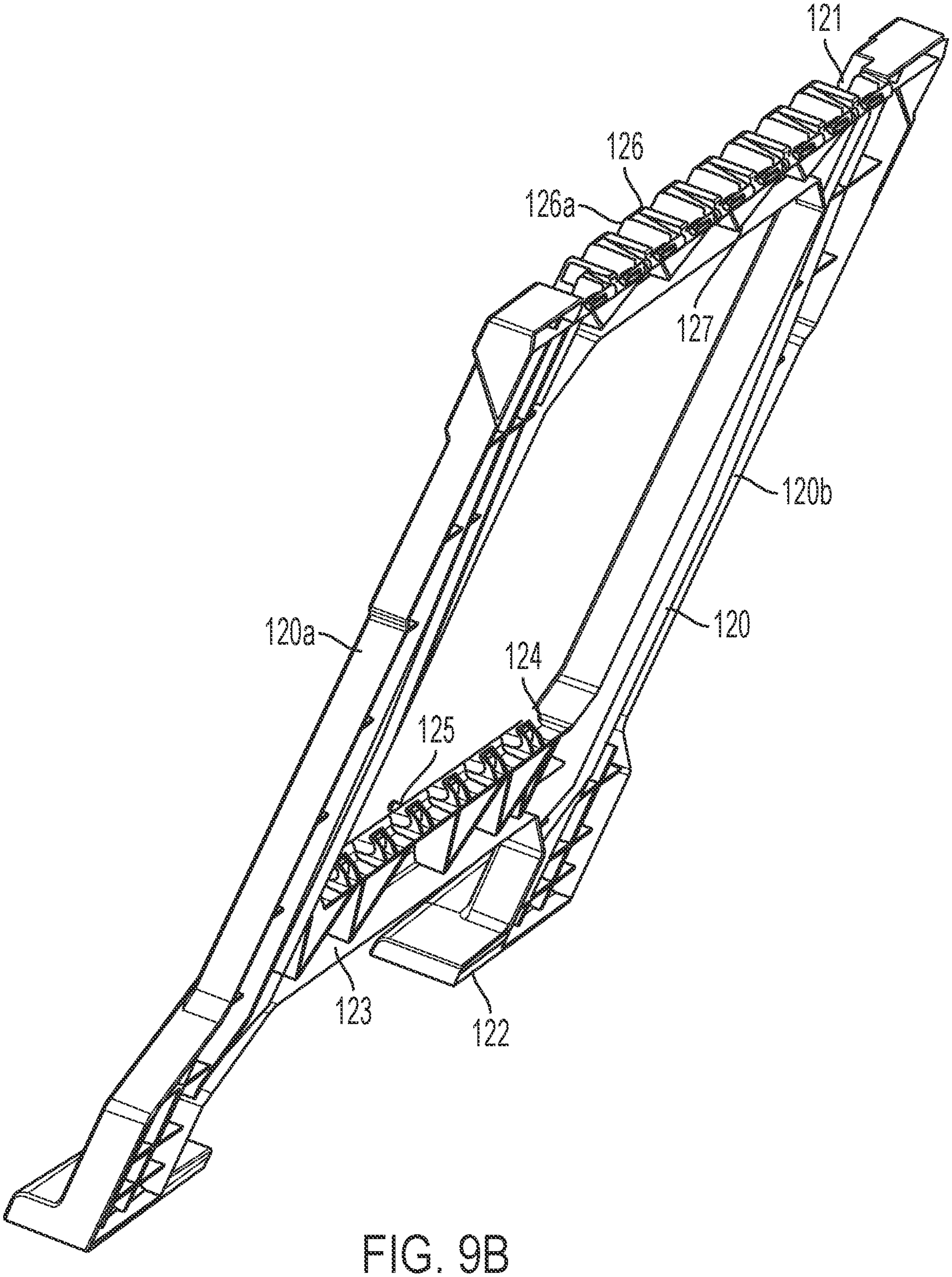
FIG. 9B is an opposite side perspective view of the second sawhorse leg shown in FIG. 9A.

With reference to FIGS. 9A and 9B, second sawhorse leg 120 is disclosed. Second saw horse leg 120 includes side leg elements 120*a* and 120*b* extending vertically, and upper leg element 121 and lower leg element 123 extending laterally therebetween. Upper leg element 121 includes spaced extending projections 126 projecting from an upper surface and forming slots 126*a* therebetween. Curved teeth 124 project upwardly from lower leg element 123, are spaced from each other, and face towards a common axis in an alternating arrangement, that is, the curved outer side of teeth 124 alternately face the forward or rearward direction relative to leg element 123. Protrusion 125 extends from the outer side of lower leg element 123 at a central location just below teeth 124. Side leg elements 120*a* and 120*b* extend outwardly downwardly from lower leg element 113 and extend into feet 122. Multiple flexible column shaped protrusions 127, for example ten such protrusions, are spaced from each other and extend laterally adjacent the top surface of leg element 121.

Figure 20:
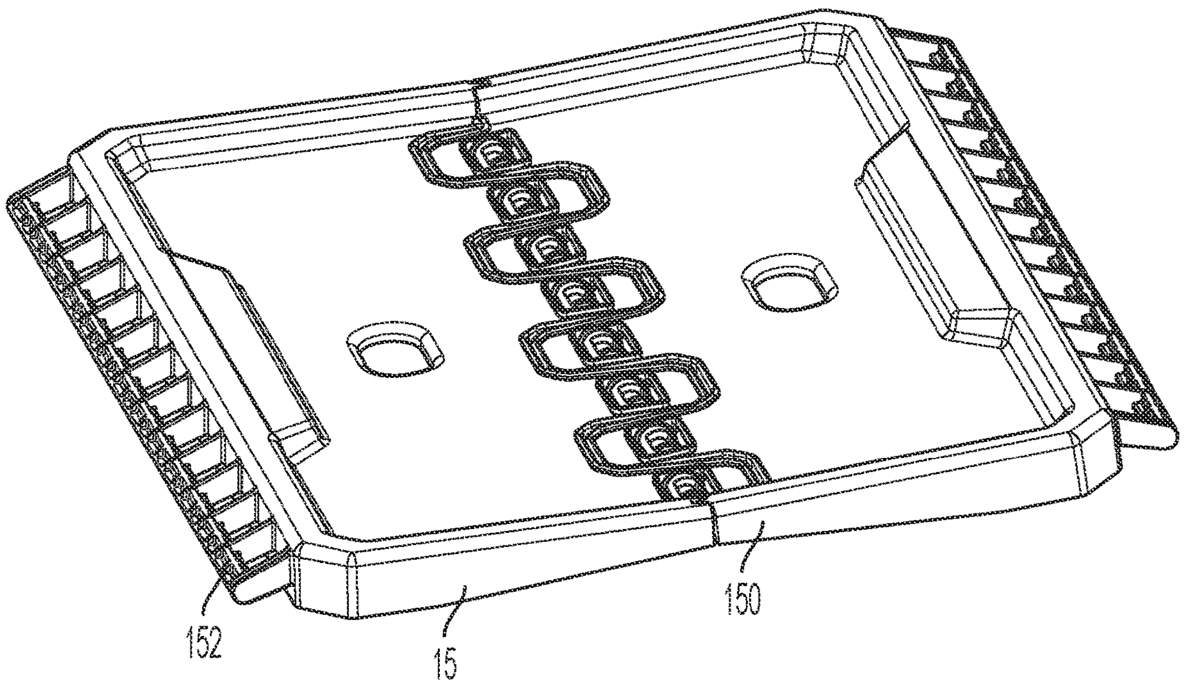
FIG. 20 is an overhead perspective view of a tray forming part of the convertible sawhorse and work table as shown in FIG. 1A.
Figure 21:
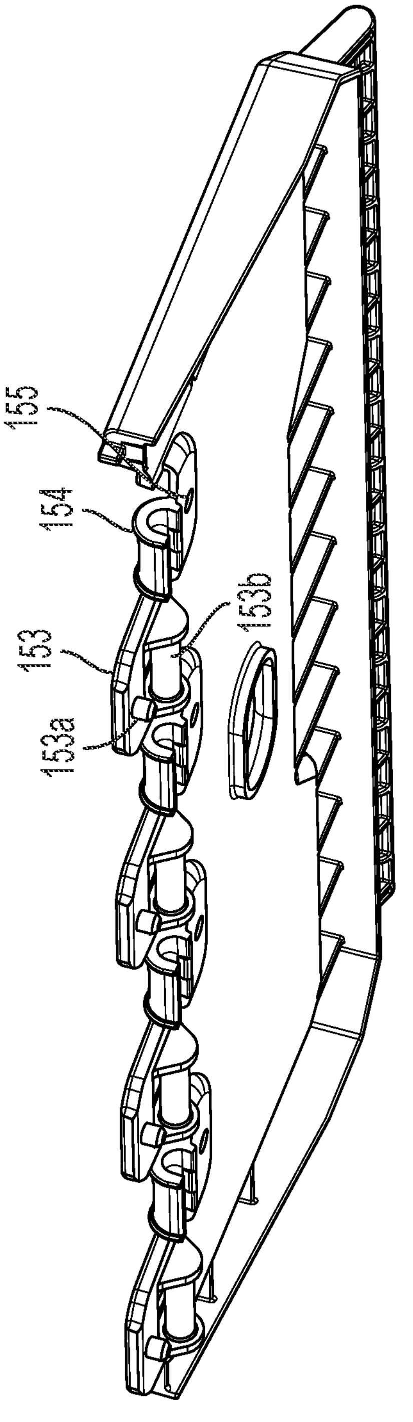
FIG. 21 is an underside perspective view a tray element forming part of the tray shown in FIG. 20.

With reference to FIGS. 20 and 21, tray 150 is disclosed. Tray 150 includes left and right tray portions 151 which are identical to each other. Tray portions 151 include four tabs 153 extending from one side surface. Protrusion 153*a* extends downwardly from each tab 153. Circular columns 153*b* extend between left and right projections extending downwardly from each tab 153. Semi-circular columns 154 extend from the same side surface, alternating with tabs 153. Openings 155 are formed through tray portions 151 behind each column 154. Tray 150 is assembled with each column 154 pivotably disposed about one circular column 153*b*, with protrusion 153*a* snapped into a corresponding hole 155. Protrusions 153*a* move out of holes 155 when tray portions 151 pivot from the open position to a fully closed position in which tray portions 151 are adjacent each other. Each tray portion 151 also includes spaced columns 152 at an opposite side from tabs 153.

With further reference to FIGS. 1, 4A, 4B and 5A, first sawhorse leg 110 is assembled to second sawhorse leg 120 with the upper surface of leg element 121 of second sawhorse leg 120 fitting below an overhanging portion of upper leg element 111 of first sawhorse leg 110. Flexible column shaped protrusions 127 of second sawhorse 120 are snap-fitted into circular through hole projections 119 of first sawhorse leg 110 to pivotably secure the sawhorse legs together around an axis created through protrusions 127. Columns 152 of tray 150 are snap fitted into teeth 114 of first sawhorse leg 110 and teeth 124 of second sawhorse leg 120 to pivotably secure tray 150 to each sawhorse leg. When the sawhorse legs are pivoted to the closed position adjacent each other, trays portions 151 pivot relative to and are folded against each other and are generally received in an open space formed between the inner surfaces of each sawhorse leg.

Figure 5E:
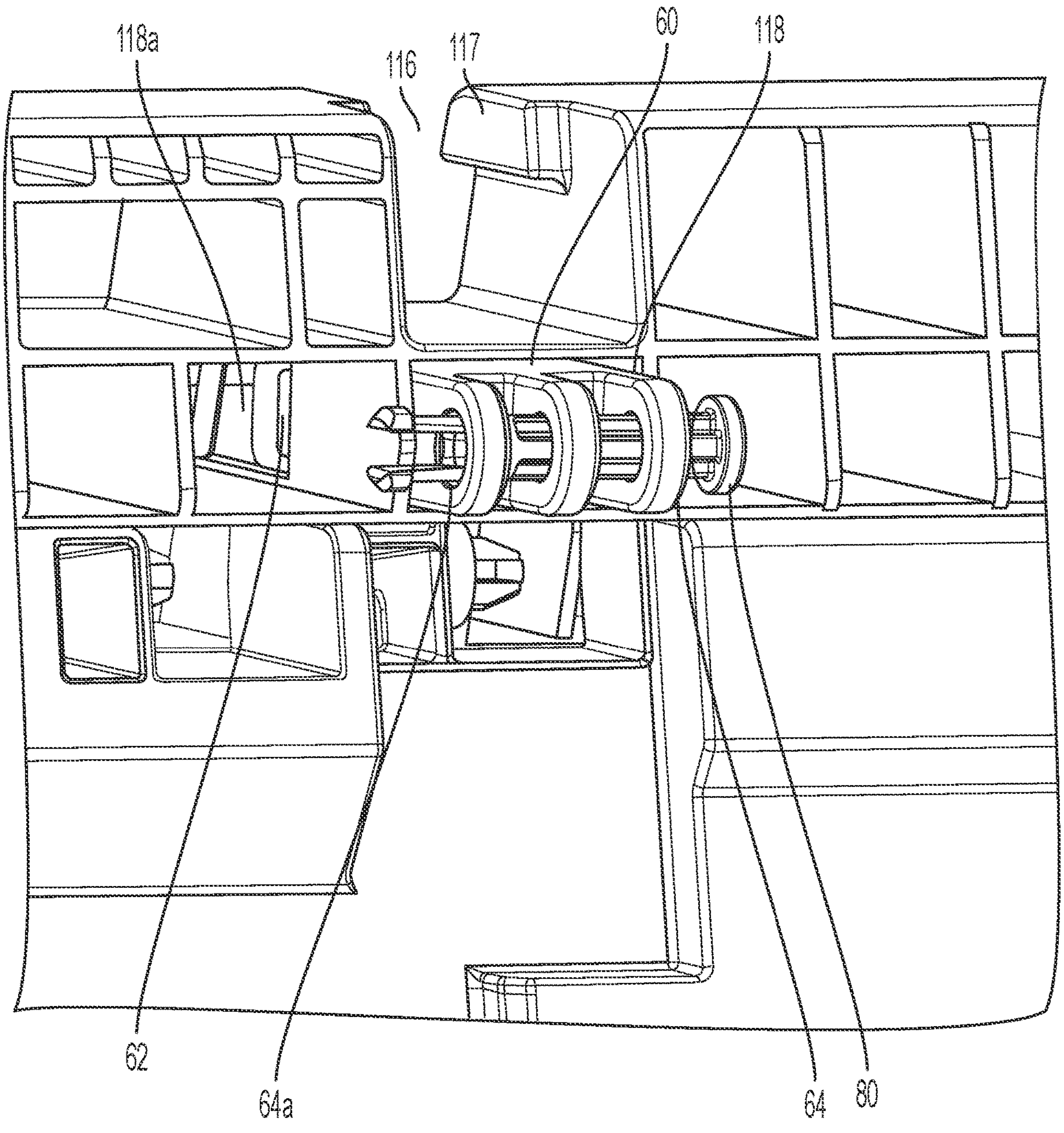
FIG. 5E is a closeup perspective view showing a portion of the top of one sawhorse leg of the convertible sawhorse and work table as shown in FIG. 1A.
Figure 13:
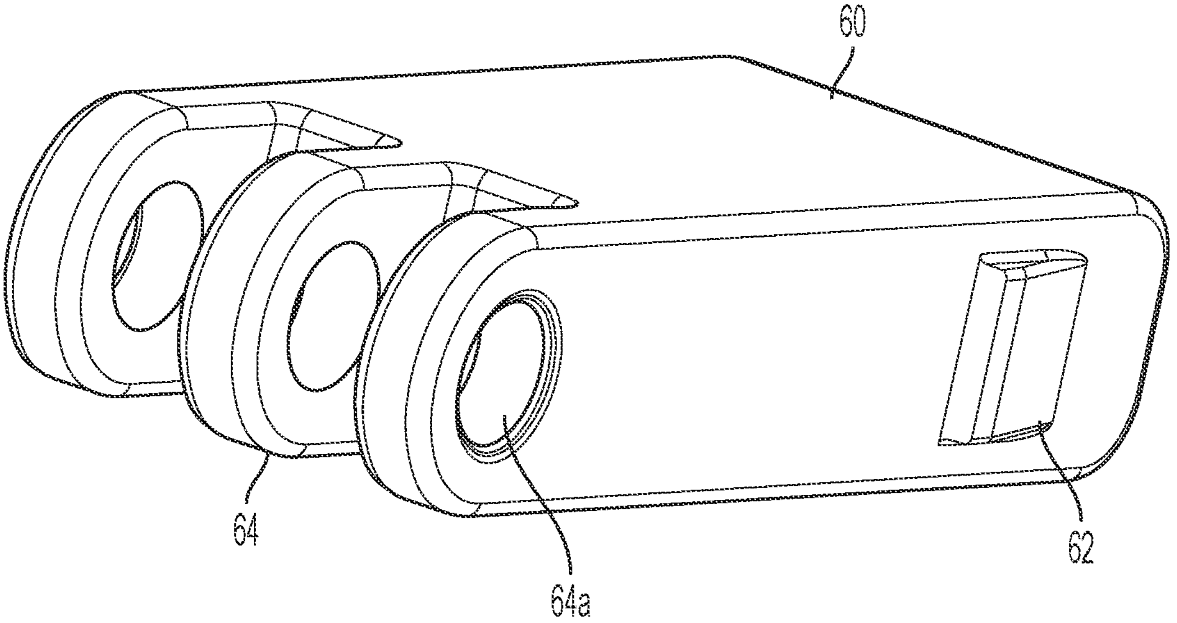
FIG. 13 is a perspective view of a slider base forming part of the convertible sawhorse and work table as shown in FIG. 1A.

With reference to FIG. 13, slider base 60 is disclosed. Slider base 60 includes flexible slider base protrusions 62 extending from both sides thereof. Slider base 60 also includes three forward spaced projections 64, each including circular through hole 64*a*. With reference to FIGS. 5E and 8A, one slider base 60 is slidably disposed into one of openings 118 formed in first leg 110. Rectangular windows 118*a* are formed in the rear of each opening 118 on either side thereof. When slider base 60 is slid into opening 118, protrusions 62 snap into each window 118*a* to secure slider base 60 therein.

Figure 11:
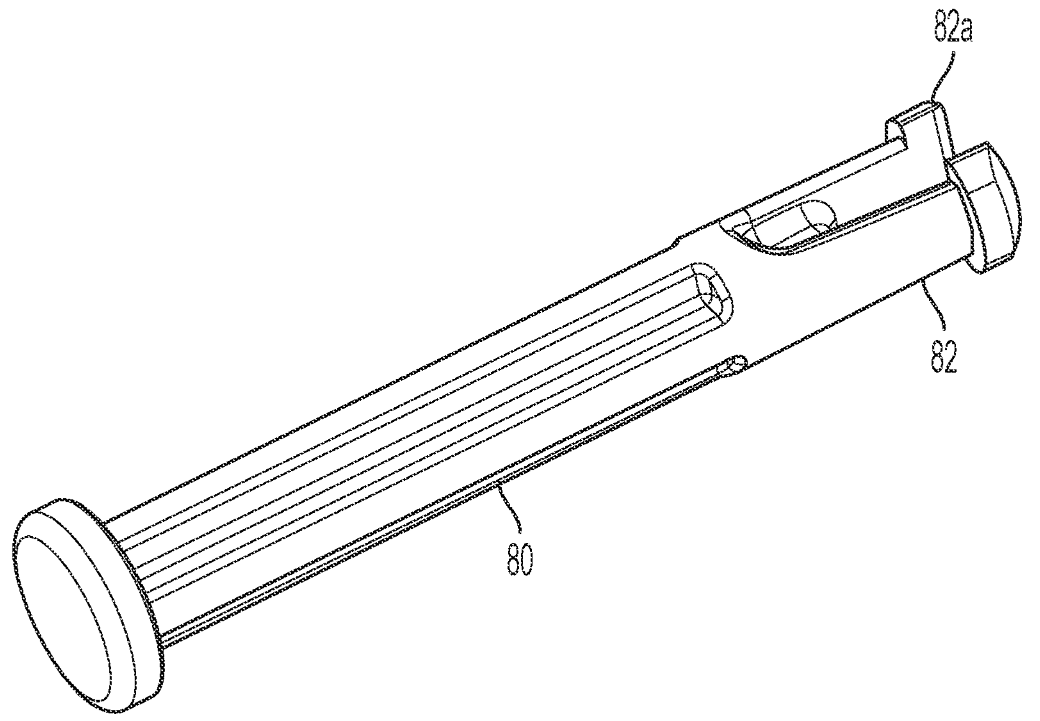
FIG. 11 is a perspective view of a slider pivot pin forming part of the convertible sawhorse and work table as shown in FIG. 1A.
Figure 12:
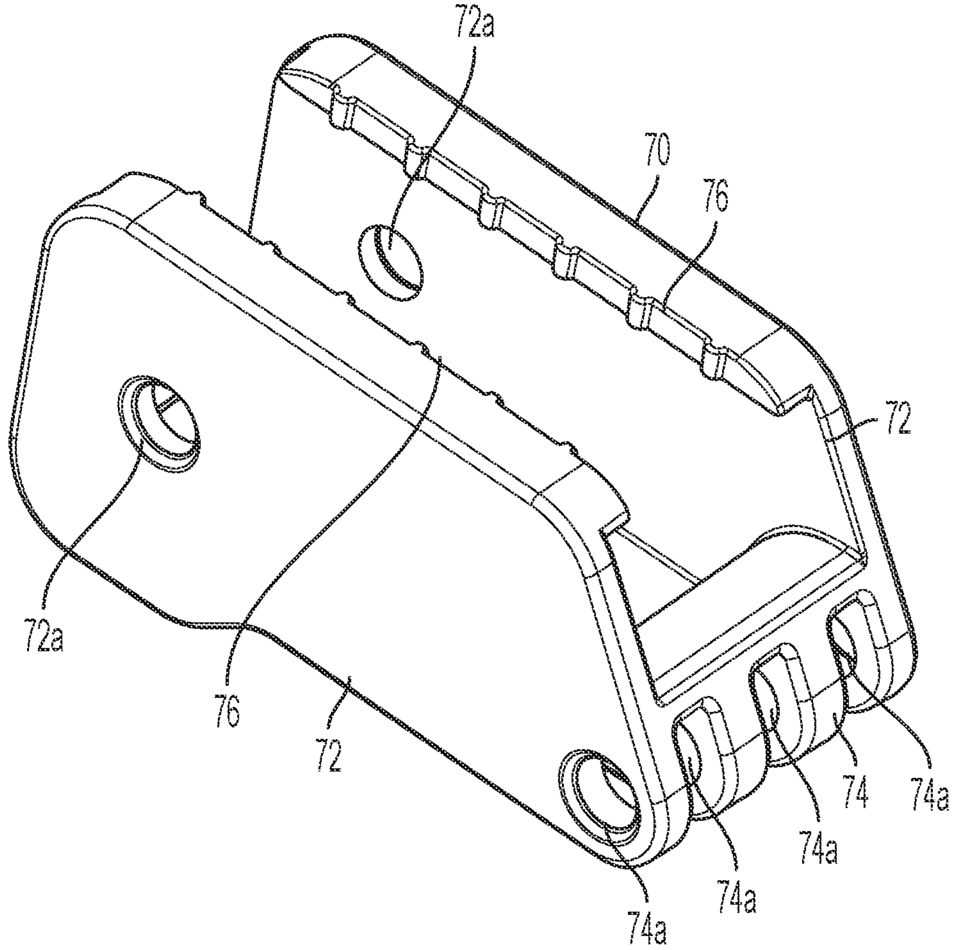
FIG. 12 is a perspective view of a pivoting slider forming part of the convertible sawhorse and work table as shown in FIG. 1A.

With reference to FIG. 12, pivoting slider housing 70 is disclosed. Slider housing 70 includes side walls 72 defining an open region therebetween. Ledges 76 extend from the top of each side wall 72 partially covering the open region. Each side wall 72 incudes a through opening 72*a* at a forward end, and five spaced projections 74 at a rearward end. Each projection 74 includes a circular opening 74*a* formed therethrough. With further reference to FIG. 11, slider pivot pin 80 is disclosed. Pivot pin 80 includes two flexible prongs 82 at one end each having forward tab 82*a*. With further reference to FIGS. 3B, 5C, 5D and 5E, slider housing 70 is secured to slider base 60 by interlacing projections 74 with projections 64 with openings 64*a* aligned with openings 74*a*, and with pivot pin 80 disposed through all of the aligned openings. Prongs 82 flex outwardly with tips 82*a* disclosed outwardly of one of side walls 72 to prevent pin 80 from sliding laterally and thereby preventing slider housing 70 from laterally moving relative to slider base 60. Slider housing 70 is thereby secured to first sawhorse leg 110 adjacent upper leg element 11. However, slider housing 70 may freely pivot about pin 80 relative to both slider base 60 and first sawhorse leg 110.

Figure 10:
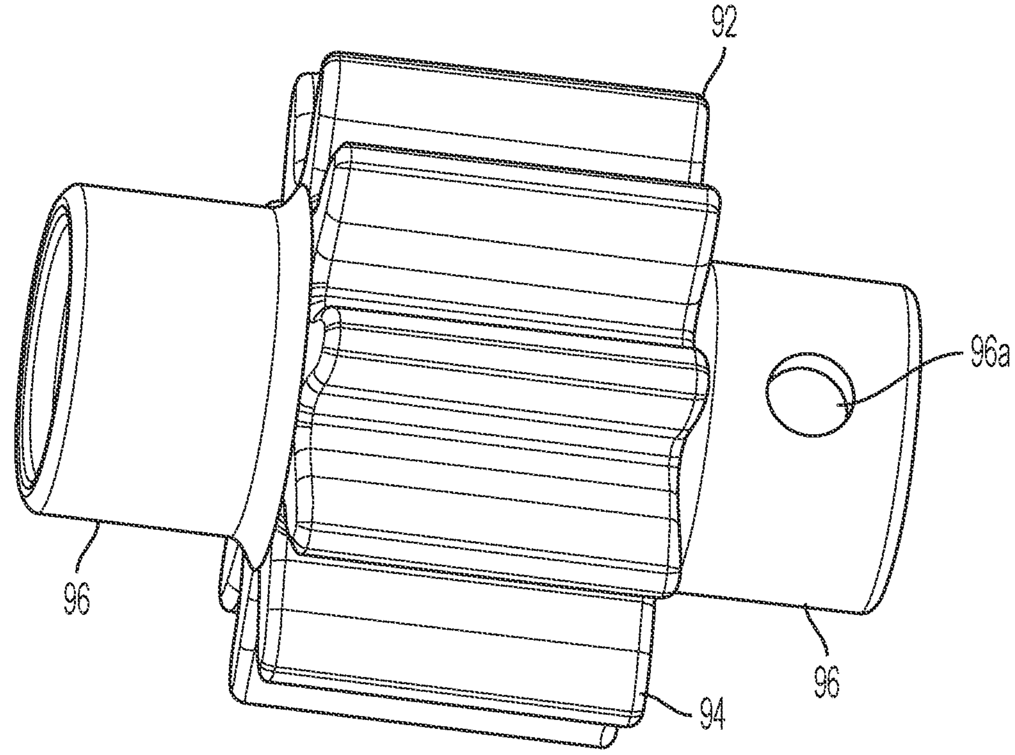
FIG. 10 is a side perspective view of a gear forming part of the convertible sawhorse and work table as shown in FIG. 1A.
Figure 17:
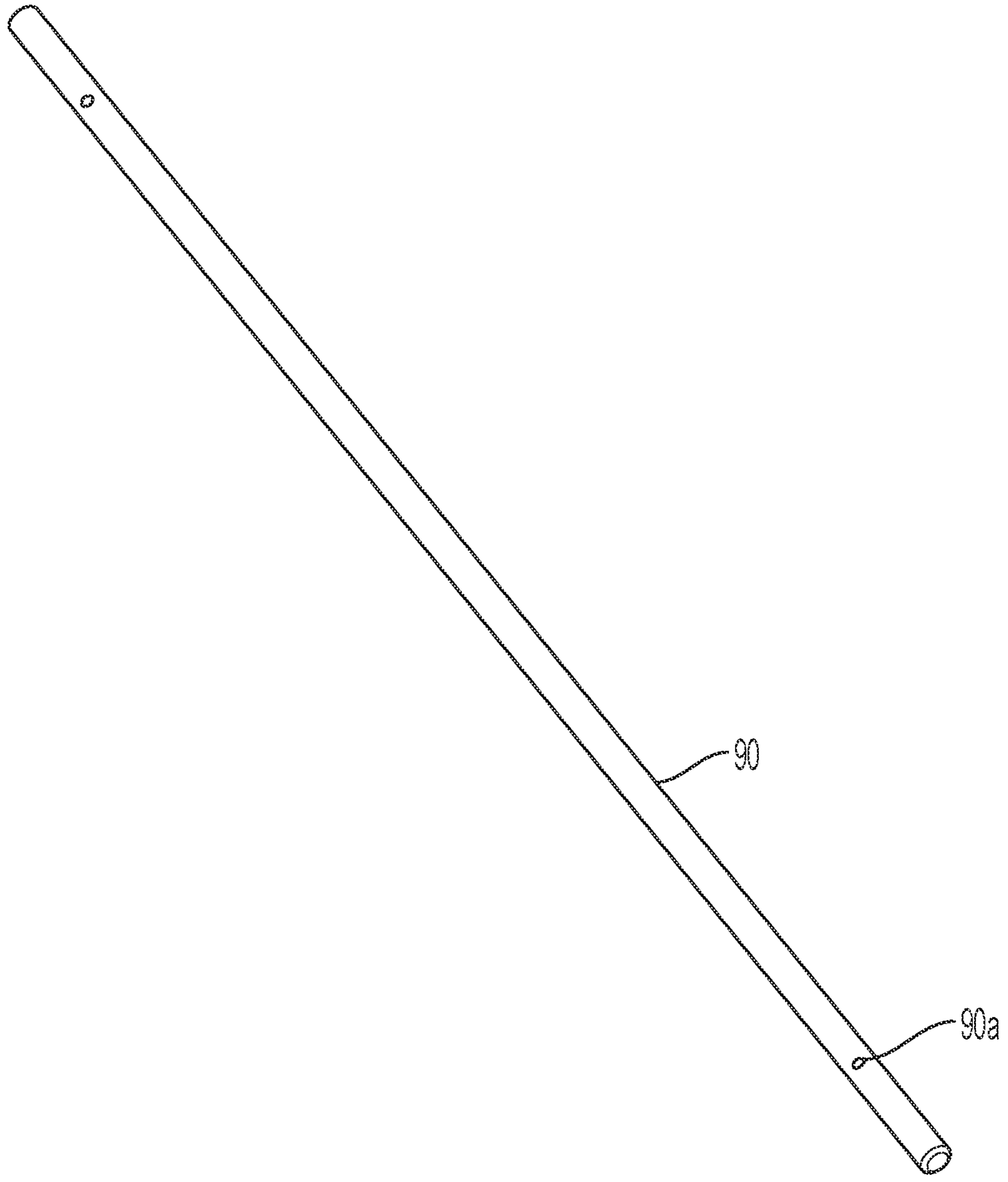
FIG. 17 is a perspective view of a gear axis rod forming part of the convertible sawhorse and work table as shown in FIG. 1A.

With reference to FIG. 17, cylindrical gear axis rod 90 is disclosed. Gear axis rod includes screw-threaded openings 90*a* adjacent each end. With reference to FIG. 10, gear 92 is disclosed. Gear 92 includes gear teeth 94 disposed about a hollow central hub and hollow circular projections 96 extending laterally from each side of the hub. One of projections 96 includes transverse through holes 96*a* extending through both sides thereof. With reference to FIGS. 3B and 5A-5D, one gear 92 is disposed in the open region of each slider housing 70. Gear axis 90 is disposed through the hollow central hub and projections 96 of each gear 92, with screw-threaded openings 90*a* disposed beneath though holes 96*a*, and a screw disposed therein to secure gears 92 near both ends of gear axis 90. Gear axis 90 also extends through openings 72*a* of both pivoting slider housings 70.

With reference to FIGS. 4A-6C, worktable 10 is slidably secured to first sawhorse leg 110 by disposing racks 30 secured thereto in rack slots 116. Rack retaining projections 117 are disposed above rack lower wall 36 to preclude vertical motion of racks 30 and thus worktable 10 relative to first sawhorse leg 110. Racks 30 are also fitted into the open regions of pivotable slider housing 70, with ledges 76 extending above lower walls 36. Rack teeth 32 engage gears 92. Therefore, worktable 10 and all elements attached thereto including racks 30 and push button 40 may move laterally across the upper surface of first sawhorse leg 110, with racks 30 sliding through slots 116. Since racks 30 and gears 92 are disposed on both lateral sides of worktable 10 and are linked by gear axis 90, any pulling or pushing force directed to only one side of worktable 10 will automatically be transferred to the other side to ensure smooth motion. Furthermore, since pivoting slider housings 70 can pivot relative to first sawhorse leg 110 when racks 30 have cleared slots 116, and slider housings 70 may pivot relative to slider bases 60, worktable 10 and housings 70 may jointly pivot relative to first sawhorse leg 110. Additionally, with reference to FIGS. 1, 4A, 6A and 6C, when convertible sawhorse and work table 1 is in the fully open position, push button teeth 42 are disposed behind and in contact with teeth 115 of first sawhorse leg 110. Since pushbutton 40 is secured to worktable 10, the contact of teeth 42 behind teeth 115 precludes lateral movement of worktable 10 relative to first sawhorse leg 110, locking convertible sawhorse and work table 1 in the fully open position. By pushing on push tab 49 against the upward spring bias and thereby pivoting pushbutton 40 about its axis 44, teeth 42 are raised to clear teeth 115, and worktable 10 can be moved laterally forward relative to first sawhorse leg 110 and out of the fully opened position.

Figure 14:
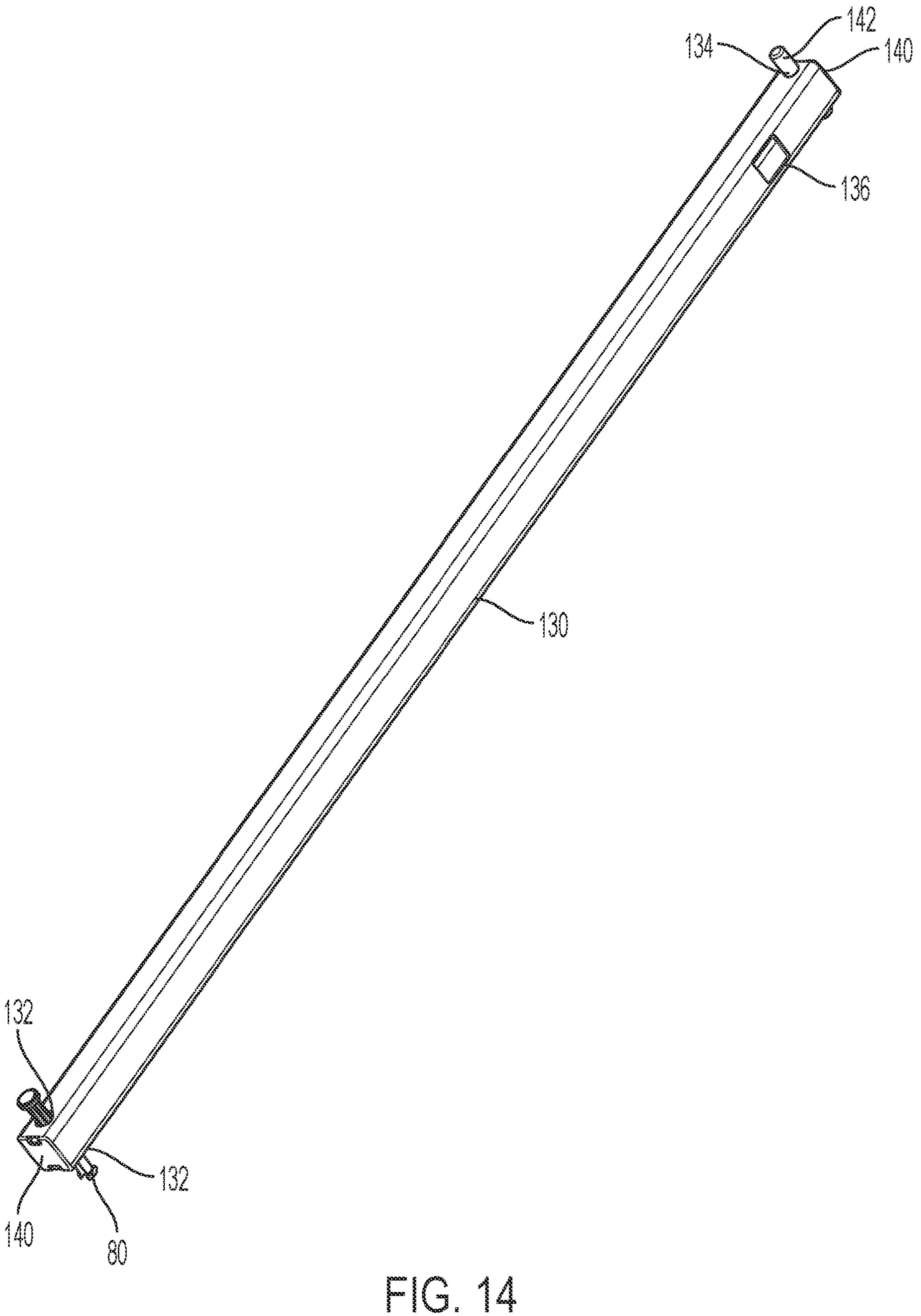
FIG. 14 is a perspective view of a pivoting support profile rod forming part of the convertible sawhorse and work table as shown in FIG. 1A.
Figure 16:
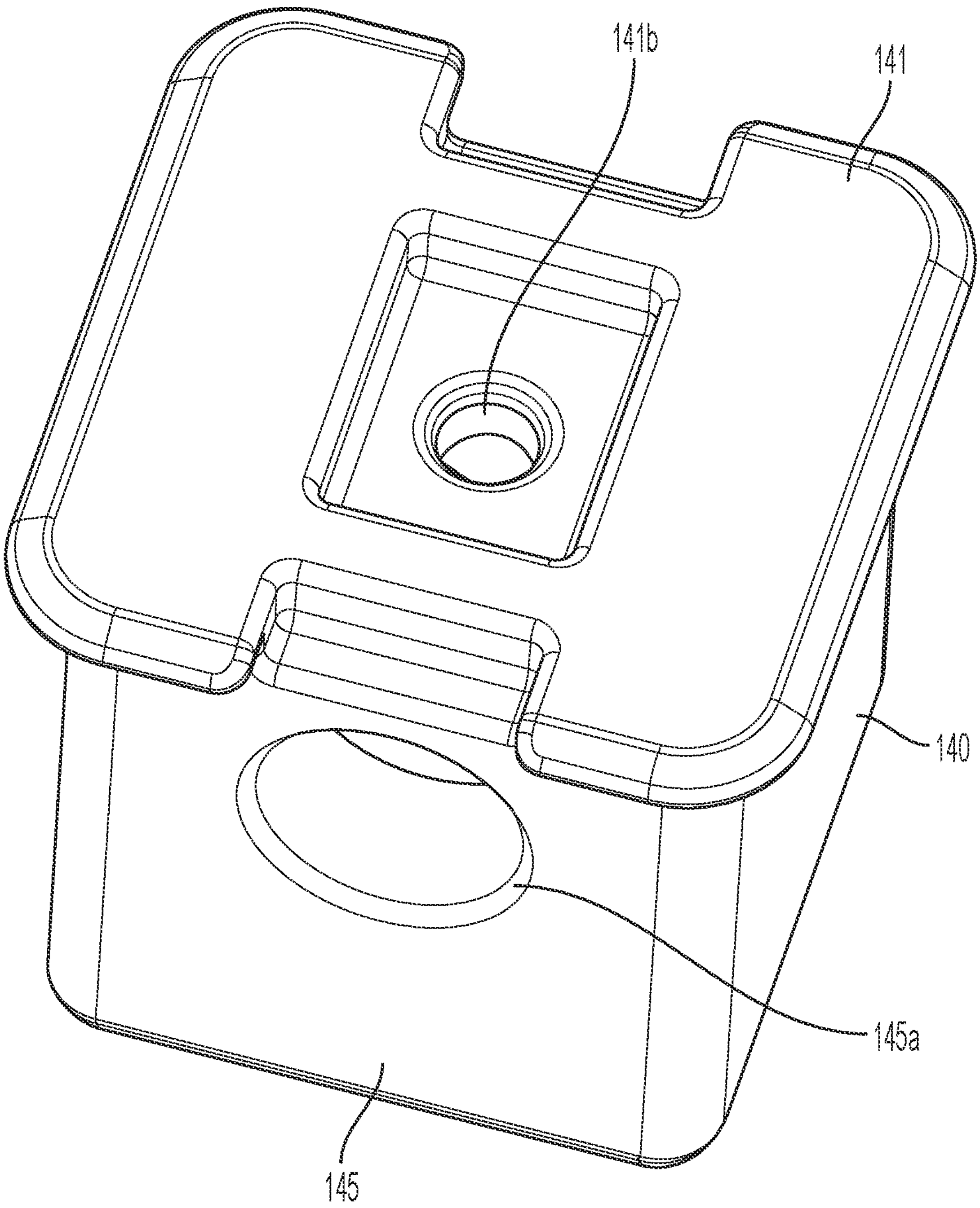
FIG. 16 is a perspective view of a profile cap forming part of the convertible sawhorse and work table as shown in FIG. 1A.

With reference to FIG. 14, pivoting support rod 130 is disclosed. Pivoting support rod 130 includes circular through openings 132 formed through and near a lower end thereof and circular through openings 134 formed through and near an upper end thereof, and rectangular through opening 136 formed adjacent and below opening 134. With reference to FIG. 16, profile cap 140 is disclosed. Profile cap 140 is substantially hollow and is defined by four side walls 145 and upper surface 141. Circular through hole 141*a* is formed through surface 141. Circular through holes 145*a* are formed through two opposite side surfaces 145. One profile cap 140 is disposed through the lower open end of each support rod 130, with through holes 145*a* aligned with circular openings 132. A second profile pad 140 is disposed in the upper end of each support rod 130 with through holes 145*a* aligned with circular openings 134.

Figure 15:
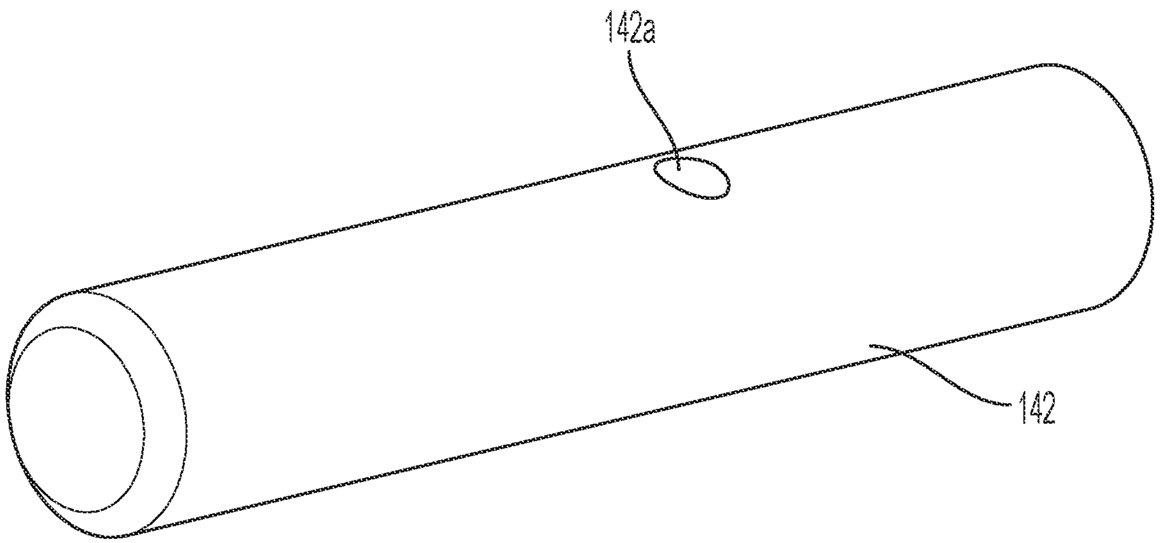
FIG. 15 is a perspective view of a cylindrical sliding rod forming part of the convertible sawhorse and work table as shown in FIG. 1A.

With reference to FIG. 15, cylindrical sliding rod 142 is disclosed and includes screw-threaded opening 142*a* formed therethrough.

With further reference to FIGS. 4A, 4B, 8B and 14, one pivoting support rod 130 is disposed on each foot 112 of first sawhorse 110. In particular, the lower surface of support rod 130 having profile pad 140 disposed therein is inserted into foot slot 112*a*, with circular openings 132 aligned with circular openings 112*b* and 112*c*. Slider pivot pin 80 is disposed through openings 112*b*, openings 132 and holes 145*a*, with prongs 82 extending into circular opening 112*c*. Prongs 82 flex outwardly to secure tabs 82*a* behind a ledge formed within openings 112*c* to retain support rod 130 on first sawhorse leg 110, while allowing pivoting movement of support rod 130 about an axis defined by pin 80 towards and away from first sawhorse leg 110.

With further reference to FIGS. 2A, 3D, 14 and 15, the manner in which the upper ends of support rods 130 are secured to worktable 110 is disclosed. A second profile pad 140 is disclosed in the upper open end of support rod 130, with though holes 145 aligned with openings 134. Cylindrical sliding rod 142 is disposed through hole 145 and openings 134 so as to include ends extending outwardly from either side of support rod 130. A screw is inserted through opening 141*b* of pad 140 and is screwed into the threaded openings 142*a* of rod 140 to secure both pad 140 and rod 142 relative to support rod 130. The upper end of support rod 130 is disposed between each pair of inner flange 26 and outer flange 24, with one end of rod 142 extending through channel 26*a* and the opposite end extending though channel 26*b*. Therefore, the upper end of support rods 130 can be moved from a location adjacent the upper end of channels 24*a*/26*a* to a location adjacent the lower end, with the outer ends of rod 42 sliding in the channels. When the upper end of supports rods 130 are located at the upper end of the channels 24*a*/26*a*, geometric tooth 27*a* is disposed in rectangular through opening 136.

Figure 4B:
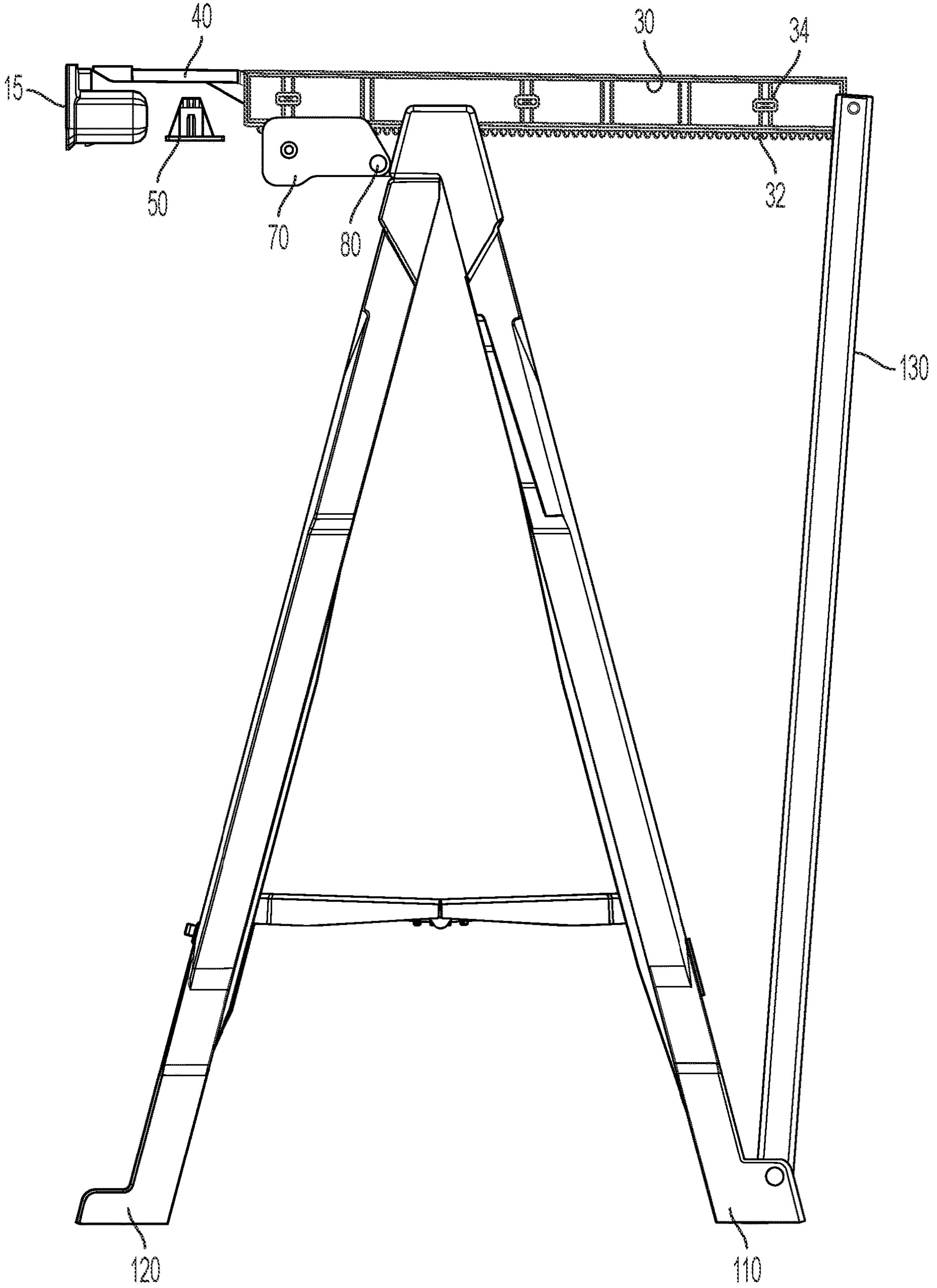
FIG. 4B is a side elevation view of the convertible sawhorse and work table as shown in FIG. 4A.
Figure 4C:
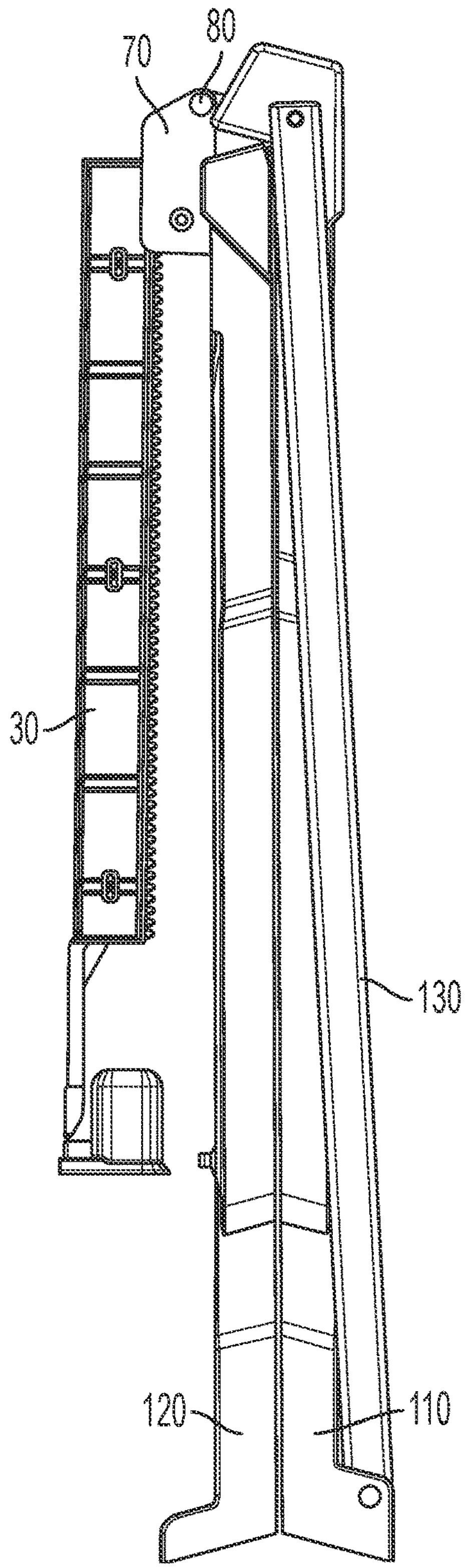
FIG. 4C is a side elevation view of the convertible sawhorse and work table as shown in FIG. 4B in the closed position.

With reference to FIGS. 1, 2A-2E and 4A-4D, the operation of convertible sawhorse and work table 1 is further explained. In FIGS. 2A and 4C, convertible sawhorse and work table 1 is in the closed position. Worktable 10 and racks 30 secured thereto are pivoted downward so as to extend adjacent and generally parallel to second sawhorse leg 120. Similarly, slider 70 is pivoted downwardly about pivot pin 80 relative to slider base 60, which is secured within first sawhorse leg 110, such that slider 70 also extends downwardly generally adjacent and generally parallel to second sawhorse leg 120. Sliding rod 142 is in a hooked part of channel 24*a*/26*a*. Since racks 30 and sliders 70 both pivot, gears 92 remain in contact with rack teeth 32.

Figure 4D:
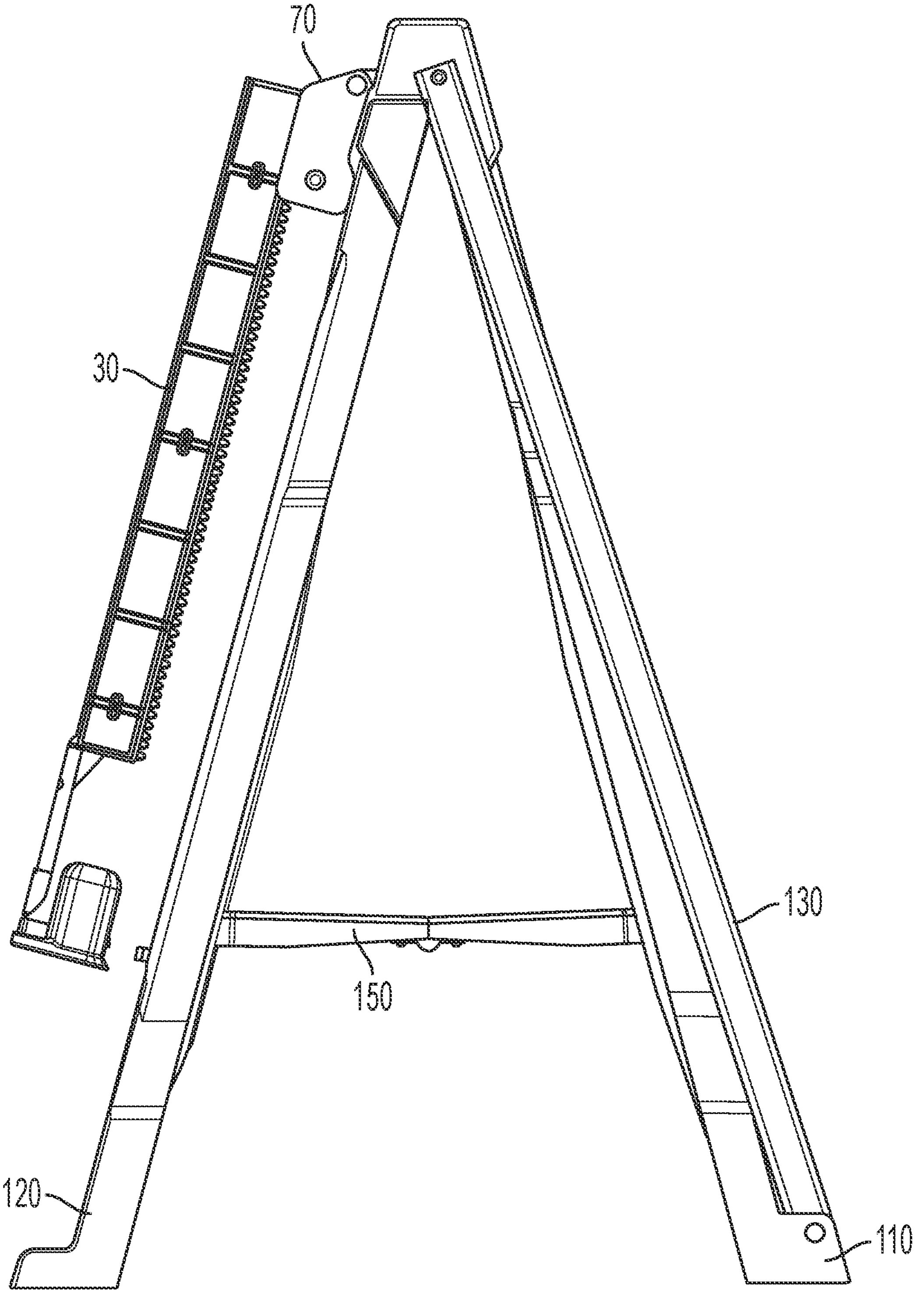
FIG. 4D is a side elevation view of the convertible sawhorse and work table as shown in FIG. 4B in the sawhorse position.

With reference to FIGS. 2B and 4D, first sawhorse leg 110 and second sawhorse leg 120 are pivoted away from each other to their fully open position relative to each other. Convertible sawhorse and work table 1 is now in the sawhorse position. Rear wall 11 of worktable 10 is now the upper most surface of the assembly and serves as the sawhorse upper surface. Sliding rod 142 has moved out of the hooked part of channel 24*a*/26*a*. The configuration of worktable 10, rack 30 and slider 70 relative to second sawhorse leg 120 has not changed, that is, they extend generally parallel and adjacent thereto. Tray 150 has pivoted to the fully open position. Geometric teeth 27*a* of cross rods 27 extend substantially parallel to the forward walls of pivoting support rods 130.

With reference to FIG. 2C, worktable 110 has been pivoted in the clockwise direction about sliding rod 142, away from second sawhorse leg 120 and is now disposed substantially horizontally above first sawhorse leg 110. Slider 70 has pivoted relative to slider housing 60 about pivot pin 80 and remains extending substantially parallel to worktable 110. The pivoting of worktable 10 relative to the upper surface of first sawhorse leg 110 has caused sliding rod 142 to slide along channel 24*a*/26*a* to an intermediate position. The pivoting of worktable 110 also causes geometric teeth 27*a* of cross rods 27 to pivot to a position where they extend substantially perpendicular the forward walls of support rods 130 but are spaced therefrom.

Figure 3D:
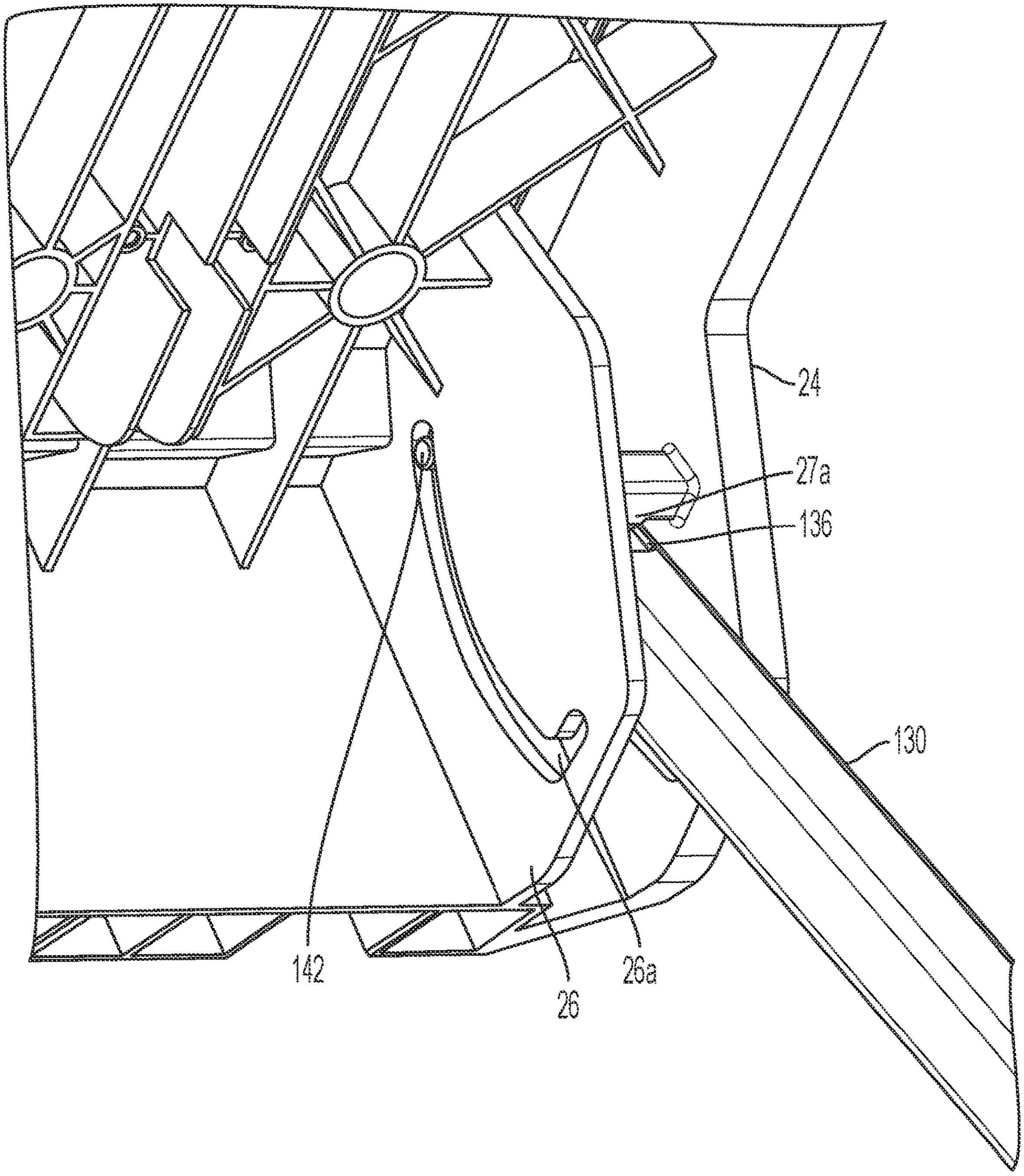
FIG. 3D is a closeup underside perspective view showing a portion of the work table shown as in FIG. 3B.
Figure 6A:
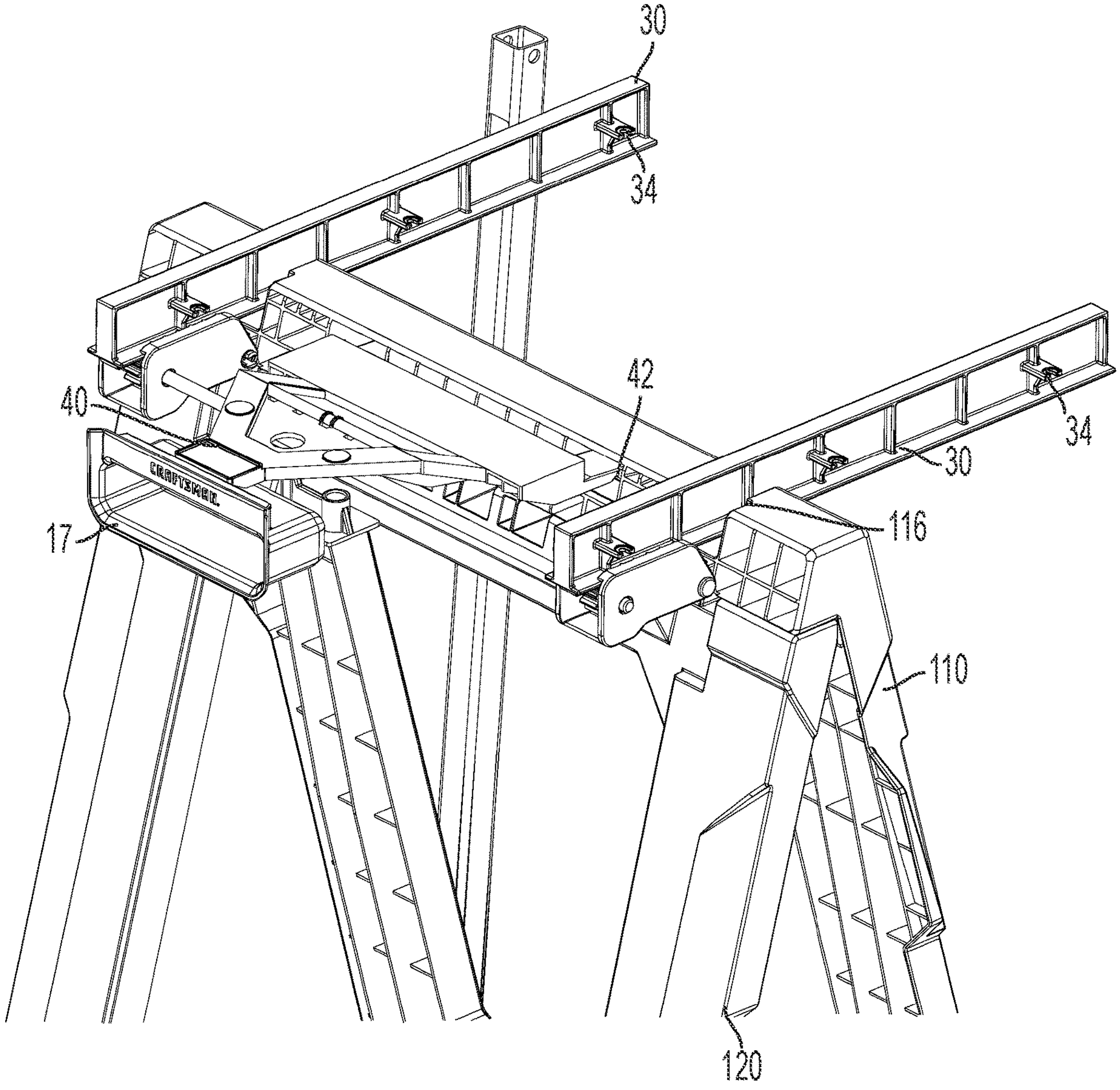
FIG. 6A is a closeup overhead perspective view of the convertible sawhorse and work table as shown in FIG. 1A showing several elements thereof with the worktable not shown.
Figure 6B:
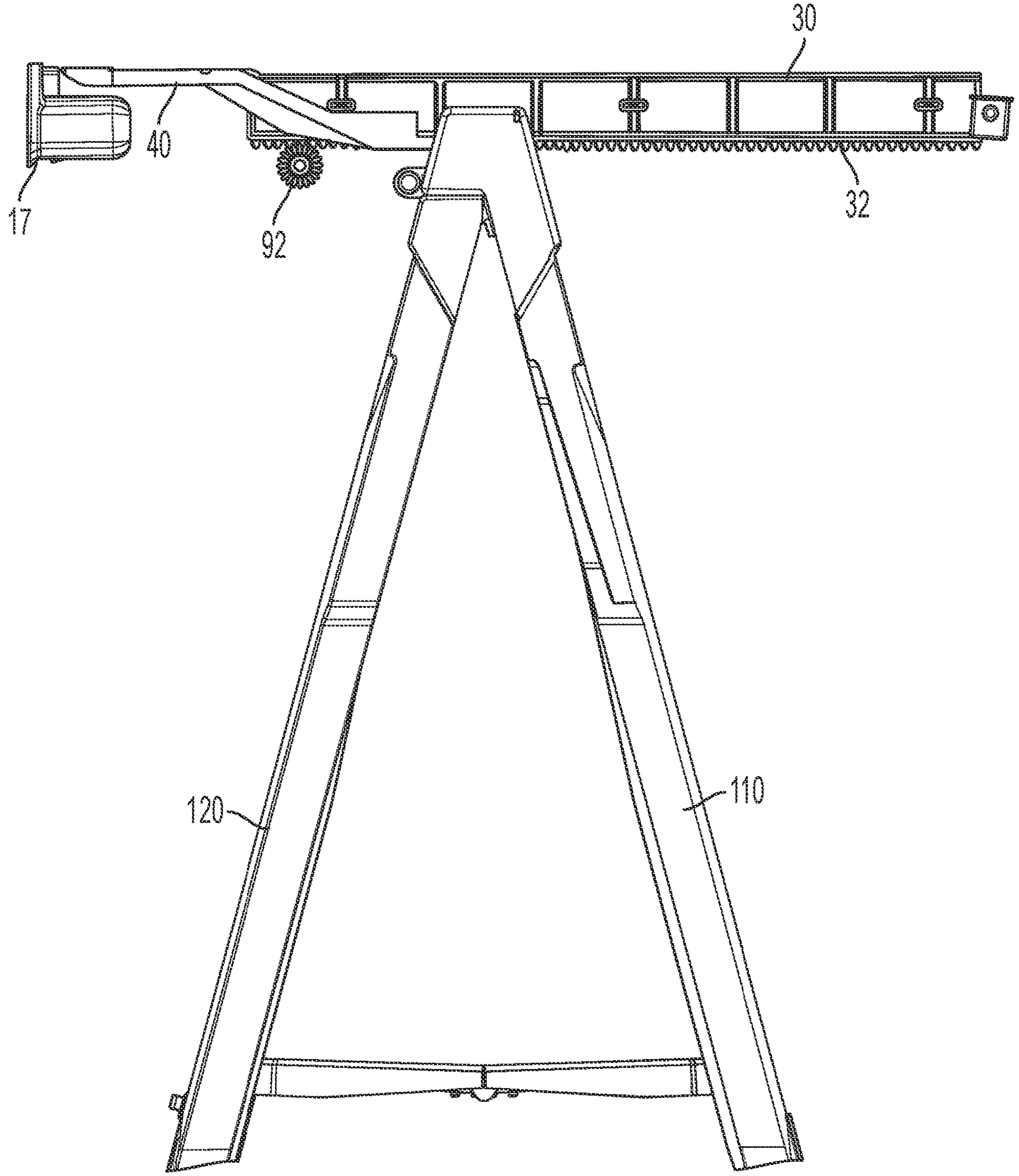
FIG. 6B is a closeup side elevation view showing several elements of the convertible sawhorse and work table as shown in FIG. 1A.
Figure 6C:
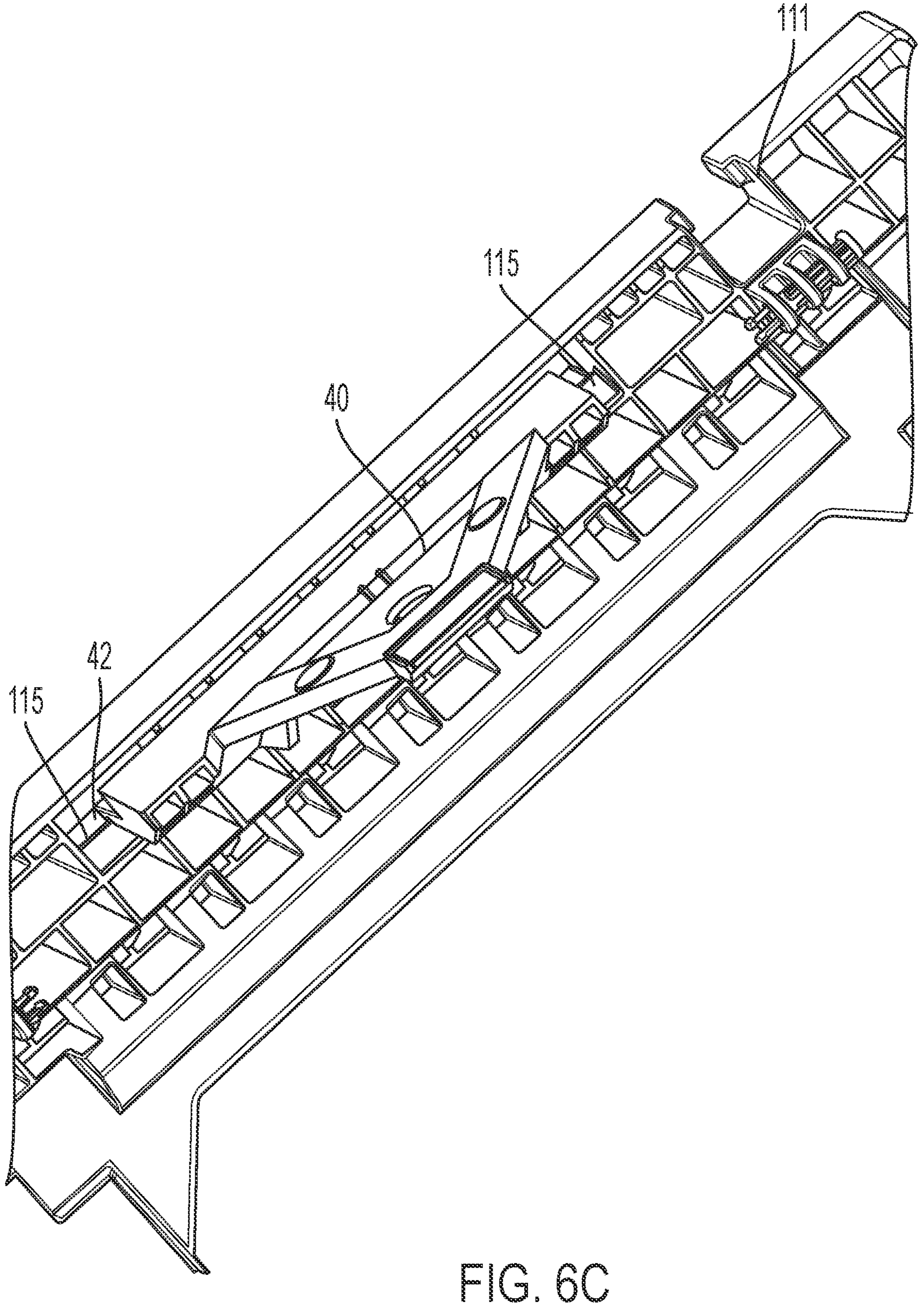
FIG. 6C is a closeup perspective view showing several elements of the convertible sawhorse and work table as shown FIG. 6B.

With reference to FIGS. 1A, 2D and 4B, worktable 10 has been slid rearwardly (to the right in the Figures) to the fully open position. During rearward motion rack teeth 32 engage gears 92 linked by gear axis 90 to ensure that that side walls 14 of worktable 10 move evenly with respect to each other such that the worktable always stays square relative to the top of first sawhorse leg 110, that is, side walls 14 of worktable 10 remain parallel to the sides of the upper first saw horse leg 110. Rearward movement of worktable 10 relative to sawhorse leg 110 forces sliding rod 142 to slide upwardly in channel 24*a*/26*a* to the uppermost end of the channel, at which point further rearward motion of worktable 10 is precluded. With reference to FIG. 1*b*, support wall 17 and side walls 17*d* of worktable 10 also contact the forward surface of upper leg element 111 to also preclude further rearward motion of worktable 10. Pivot support rods 130 pivot about pivot pins 80 in feet 112 to a position in which they are spaced from first sawhorse leg 110, and which is slightly past vertical. With reference to FIGS. 3C and 3D, geometric teeth 27*a* of cross rods 27 are also moved rearwardly and lodge within rectangular openings 136 of pivoting support rods 130, which precludes upward movement of rear wall 11 of table 110 at the locations of support rods 130. Projections 117 in rack slots 116 preclude upward movement of worktable 110. With further reference to FIGS. 6A and 6C, teeth 42 of pushbutton 40 lodge behind raised teeth 115 of first sawhorse leg 110 to preclude forward movement of worktable 110 relative thereto, and convertible sawhorse and work table 1 is locked in the worktable position.

To close convertible sawhorse and work table 1, push tab 49 is pushed to pivot push button 40 to remove teeth 42 from behind raised teeth 115. Work table 110 can be moved forwardly to cause geometric teeth 27*a* to move out of rectangular openings 136. Sliding rod 142 moves downwardly in channel 24*a*/26*a* until the position shown in FIG. 2C is reached. Worktable 10 is then pivoted downwardly towards second sawhorse leg 120 to the sawhorse position shown in FIG. 2B in which worktable 110 is locked to sawhorse leg 120. First sawhorse leg 110 and second sawhorse leg 120 are then pivoted relative to each other to achieve the closed position of FIG. 2A.

The invention claimed is:

1. An assembly comprising:

a sawhorse including a first sawhorse leg and a second sawhorse leg pivotably connected to each other at the upper ends thereof, said sawhorse legs including a sawhorse foot at the lower ends thereof;

a worktable having a lower surface and a rack disposed on said lower surface;

a pivot support rod pivotably mounted at a lower end thereof to said foot of said first sawhorse leg and slidably mounted at an upper end to said worktable;

a gear disposed in engagement with said rack;

slider base fixedly secured to said first sawhorse leg a slider housing pivotably secured to said slider base and having an interior region therein, said gear and said rack disposed within said slider housing interior region.

2. An assembly comprising:

a sawhorse including a first sawhorse leg and a second sawhorse leg pivotably connected to each other at the upper ends thereof, said sawhorse legs including sawhorse feet at the lower ends thereof;

two pivot support rods, each said support rod pivotably mounted at a lower end thereof to the feet of said first sawhorse leg and having a sliding rod disposed therethrough adjacent an upper end thereof;

a worktable having a lower surface and two pairs of flanges, each of said pair of flanges disposed at a corner of the worktable, each said flange having a channel formed therethrough, one of said sliding rods slidably disposed at either end thereof in one channel of one flange of a pair of flanges with said either end moving translationally along said channels, said worktable having a first rack and a second rack disposed on said lower surface;

a first gear disposed in engagement with said first rack and a second gear disposed in engagement with said second rack; and a gear axis rod extending between and engaged with said first gear and said second gear.

3. The assembly recited in claim 2, said channels being C-shaped.

* * * * *